United States Patent
Qiao et al.

(10) Patent No.: US 10,029,207 B2
(45) Date of Patent: Jul. 24, 2018

(54) COMPOSITE GAS SEPARATION MEMBRANE

(71) Applicant: The University of Melbourne, Carlton, Victoria (AU)

(72) Inventors: Greg Guanghua Qiao, Victoria (AU); Qiang Fu, Victoria (AU); Sandra Elizabeth Kentish, Victoria (AU); Jinguk Kim, Victoria (AU)

(73) Assignee: THE UNIVERSITY OF MELBOURNE, Victoria (AU)

( * ) Notice: Subject to any disclaimer, the term of this patent is extended or adjusted under 35 U.S.C. 154(b) by 82 days.

(21) Appl. No.: 15/036,700

(22) PCT Filed: Nov. 14, 2014

(86) PCT No.: PCT/AU2014/050351
§ 371 (c)(1),
(2) Date: May 13, 2016

(87) PCT Pub. No.: WO2015/070288
PCT Pub. Date: May 21, 2015

(65) Prior Publication Data
US 2017/0216765 A1    Aug. 3, 2017

(30) Foreign Application Priority Data
Nov. 14, 2013    (AU) ............................... 2013904395

(51) Int. Cl.
*B01D 53/22* (2006.01)
*B01D 71/64* (2006.01)
(Continued)

(52) U.S. Cl.
CPC ......... *B01D 53/228* (2013.01); *B01D 69/125* (2013.01); *B01D 69/148* (2013.01);
(Continued)

(58) Field of Classification Search
CPC .................. B01D 53/22; B01D 53/228; B01D 2053/221; B01D 69/10; B01D 69/125;
(Continued)

(56) References Cited

U.S. PATENT DOCUMENTS 4,602,922 A * 7/1986 Cabasso ............... B01D 69/125
427/245
5,049,167 A * 9/1991 Castro .................. B01D 69/125
95/55

(Continued)

FOREIGN PATENT DOCUMENTS

WO    WO 2009/059360 A1    5/2009

OTHER PUBLICATIONS

Chen et al., "Multi-layer composite hollow fiber membranes derived from poly(ethylene glycol) (PEG) containing hybrid materials for CO2/N2 separation," Journal of Membrane Science, 2011, pp. 211-220, vol. 381.

(Continued)

*Primary Examiner* — Jason M Greene
(74) *Attorney, Agent, or Firm* — Arent Fox LLP

(57) ABSTRACT

The present invention relates to a gas separation membrane for separating a target gas species from a mixture of gas species, the membrane comprising:
(i) a porous substrate having a first and second surface region between which the mixture of gas species will flow;
(ii) a sealing polymer layer of different composition to the porous substrate that (a) forms a continuous coating across the second surface region of the substrate, and (b) is permeable to the mixture of gas species; and
(iii) a selective polymer layer in the form of a cross linked macromolecular film that (a) is located on and covalently coupled to the sealing polymer layer, and (b) has (Continued)

a higher permeability to the target gas species relative to other gas species present in the mixture of gas species that is to be subjected to separation.

20 Claims, 19 Drawing Sheets

(51) Int. Cl.
| | | |
|---|---|---|
| B01D 71/70 | (2006.01) | |
| B01D 69/12 | (2006.01) | |
| B01D 69/14 | (2006.01) | |
| B01D 71/52 | (2006.01) | |
| B01D 71/80 | (2006.01) | |
| C08K 5/00 | (2006.01) | |
| C08G 77/388 | (2006.01) | |
| C08J 9/36 | (2006.01) | |

(52) U.S. Cl.
CPC ............ *B01D 71/52* (2013.01); *B01D 71/64* (2013.01); *B01D 71/70* (2013.01); *B01D 71/80* (2013.01); *C08G 77/388* (2013.01); *C08J 9/365* (2013.01); *C08K 5/0091* (2013.01); *B01D 2053/221* (2013.01); *B01D 2323/30* (2013.01); *B01D 2323/40* (2013.01); *C08G 2340/00* (2013.01); *C08J 2333/20* (2013.01); *C08J 2383/12* (2013.01)

(58) Field of Classification Search
CPC ...... B01D 69/148; B01D 71/52; B01D 71/64; B01D 71/70; B01D 71/80; B01D 2323/30; B01D 2323/40; C08G 77/388; C08G 2340/00; C08J 9/365; C08J 2333/20; C08J 2383/12; C08K 5/0091
See application file for complete search history.

(56) References Cited

U.S. PATENT DOCUMENTS

| | | | |
|---|---|---|---|
| 5,286,280 A * | 2/1994 | Chiou | B01D 53/228 427/412.1 |
| 8,496,997 B2 | 7/2013 | Caruso et al. | |
| 2009/0131242 A1* | 5/2009 | Liu | B01D 53/228 502/4 |
| 2011/0269915 A1* | 11/2011 | Koros | B01D 53/228 525/420 |
| 2012/0297976 A1 | 11/2012 | Sano | |
| 2015/0143995 A1* | 5/2015 | Umehara | B01D 53/228 96/13 |
| 2016/0023171 A1* | 1/2016 | Phillip | B01D 69/02 210/650 |

OTHER PUBLICATIONS

International Search Report issued in PCT/AU2014/050351 dated Jan. 22, 2015.
Javaid, "Membranes for solubility-based gas separation applications," Chemical Engineering Journal, 2005, pp. 219-226, vol. 112.
Merkel et al., "Power plant post-combustion carbon dioxide capture: An opportunity for membranes," Journal of Membrane Science, 2010, pp. 126-139, vol. 359.
Moad et al., "Radical addition-fragmentation chemistry in polymer synthesis," Polymer, 2008, pp. 1079-1131, vol. 49.
Robeson, "Correlation of separation factor versus permeability for polymeric membranes," Journal of Membrane Science, 1991, pp. 165-185, vol. 62.
Zhang et al., "Surface modification of PDMS by surface-initiated aton transfer radical polymerization of water-soluble dendronized PEG methacrylate," Colloids and Surfaces B: Biointerfaces, 2011, pp. 85-92, vol. 88.

* cited by examiner

COMPOSITE GAS SEPARATION MEMBRANE

CROSS-REFERENCE TO RELATED APPLICATIONS

This application is a National Stage entry of International Application No. PCT/AU2014/050351, filed Nov. 14, 2014, which claims priority to Australian Patent Application No. 2013904395, filed Nov. 14, 2013. The disclosures of the prior applications are hereby incorporated in their entirety by reference.

FIELD OF THE INVENTION

The present invention relates in general to gas separation membranes. In particular, the invention relates to composite membranes for gas separation, a method of preparing the same, and to a process for separating a target-species from a mixture of gas species.

BACKGROUND OF THE INVENTION

Gas separation membranes are used in various industrial processes including the production of oxygen enriched air, separation of moisture or carbon dioxide from natural gas, and the recovery or capture of a desired gas species from vented gases such as flue gas form coal and natural gas power stations.

The composition of flue gases from power plants varies greatly depending upon the fuel source used, but will typically comprise gas species such as $N_2$, $O_2$, $H_2O$, $CO_2$, $SO_x$, $NO_x$ and/or HCl. Gas separation membranes may be used to separate a target gas species from gas mixtures such as that provided by flue gases.

One gas that is a common target gas species to be separated from a mixture of gas species is $CO_2$. In that case, it is often desirable to separate $CO_2$ from gases such as $H_2$, $N_2$, and/or $CH_4$. Other desirable gas separation combinations include $O_2/N_2$ (i.e. oxygen gas from nitrogen gas), $He/N_2$ and $He/CH_4$.

Polymers are commonly used for gas separation membranes. For a given polymer to function effectively as a gas separation membrane it needs to meet a number of criteria. One such criterion is an ability for gas to permeate through the polymer membrane so as to achieve a satisfactory gas flux during separation.

A second criterion is for the polymer membrane to provide appropriate selective separation of a target gas species from a mixture of gas species (commonly referred to as the "selectivity" of the membrane). In the simplest case, the selectivity can be defined as the permeability of the target gas (gas A($P_A$)) over the permeability of the other gas species present (gas B($P_B$)):

$P_A/P_B$

A third criterion is that the polymer membrane should provide good thermal mechanical properties so as to afford sound structural stability during the separation process, which may be conducted under pressure.

The two criteria of permeability of the membrane to the mixture of gas species, and selectivity of the membrane to the target gas species over other gas species present in the mixture, typically have an inverse relationship. In other words, increasing the permeability of the membrane tends to decrease its selectivity (i.e. as increasing the permeability tends to increase the permeability for all gases). Similarly, increasing the selectivity of the membrane for a target gas species over other gas species present tends to decrease its permeability to the target gas species (i.e. the restriction of flow of non-target gas species through the membrane tends to restrict flow of all gas species, even though the restriction of flow of the target species is not as severe). This phenomenon has been studied, and the upper boundary on the combination of permeability and selectivity has been plotted. The plot of the upper boundary of permeability against selectivity is known as Robeson's upper bound (Journal of Membrane Science, 1991, 62, pg 165).

Considerable research to date has been directed toward developing gas separation membranes that exhibit a suitable balance between permeability and selectivity for viable commercial gas separation processes, coupled with adequate structural stability for use in such processes.

Accordingly, there remains an opportunity to develop new gas separation membranes that exhibit improved properties or offer a practical alternative to known gas separation membranes.

SUMMARY OF THE INVENTION

The present invention therefore provides a gas separation membrane for separating a target gas species from a mixture of gas species, the membrane comprising:
(i) a porous substrate having a first and second surface region between which the mixture of gas species will flow;
(ii) a sealing polymer layer of different composition to the porous substrate that (a) forms a continuous coating across the second surface region of the substrate, and (b) is permeable to the mixture of gas species; and
(iii) a selective polymer layer in the form of a cross linked macromolecular film that (a) is located on and covalently coupled to the sealing polymer layer, and (b) has a higher permeability to the target gas species relative to other gas species present in the mixture of gas species that is to be subjected to separation.

The gas separation membrane in accordance with the invention comprises three main components, namely a porous substrate, a sealing polymer layer and a selective polymer layer. Each of these three components have specific features and collectively they provide for a unique composite gas separation membrane that exhibits improved properties and can be manufactured at relatively low cost. For example, a gas separation membrane in accordance with the invention has been found to exhibit a $CO_2$ permeance of more than 1,000 gpu and a $CO_2/N_2$ selectivity of more than 20.

The combination of the porous substrate and the sealing polymer layer provide the membrane with sound mechanical properties, together with a surface upon which a continuous coating of the selective polymer layer can be affectively and efficiently presented. The porous substrate and the sealing polymer layer exhibit good permeance to the mixture of gas species that is to be separated, whereas the selective polymer layer has a higher permeability to the target gas species to be separated relative to other gas species present in the mixture of gas species.

The selective polymer layer can advantageously be presented on the surface of the sealing polymer layer in the form of an ultra-thin layer (e.g. less than 100 nm, or even less than 50 nm). Minimising the thickness of the selective polymer layer has been found to improve the properties of the gas separation membrane and also reduce the manufacturing cost of the membrane.

In one embodiment, the selective polymer layer incorporates solid nanoparticles within its polymer matrix. Incorporating the nanoparticles into the selective polymer layer can advantageously improve the permeability and/or selectivity of the separation membrane.

The present invention also provides a method of preparing a gas separation membrane for separating a target gas species from a mixture of gas species, the method comprising:

(i) providing a porous substrate having (a) a first and second surface region between which the mixture of gas species will flow, and (b) a sealing polymer layer that forms a continuous coating across the second surface region and is permeable to the mixture of gas species; wherein the sealing polymer layer is of different composition to the porous substrate and presents at its outermost surface a plurality of living polymerisation moieties that are covalently bound to polymer chains that form part of the sealing polymer layer; and (ii) forming on the outermost surface of the sealing polymer layer a selective polymer layer in the form of a cross-linked macromolecular film by polymerising, under the control of the living polymerisation moieties, macromolecules having a plurality of polymerisable functional groups; wherein the resulting selective polymer layer has a higher permeability to the target gas species relative to other gas species present in the mixture of gas species that is to be subjected to separation.

The porous substrate having the sealing polymer layer may be prepared by any suitable means. In one embodiment, the sealing polymer layer is applied to the second surface region of the porous substrate by spin-coating, slot die coating, knife coating or dip-coating.

In another embodiment, the macromolecules having a plurality of polymerisable functional groups used for forming the selective polymer layer on the outermost surface of the sealing polymer comprise solid nanoparticles.

The present invention also provides for use of a gas separation membrane according to the present invention for separating a target-species from a mixture of gas species.

The present invention further provides a process for separating a target gas species from a mixture of gas species, the process comprising:

(i) contacting the mixture of gas species to be separated with the gas separation membrane according to the invention;

(ii) creating a difference in pressure across the gas separation membrane to facilitate transport of the target gas species through the selective polymer layer so as to provide for a separated gas composition; wherein the concentration of the target gas species is higher in the separated gas composition compared with that in the mixture of gas species that was subjected to separation.

In one embodiment, the gas separation membrane according to the invention is for separating $CO_2$ as the target gas species from a mixture of gas species comprising $CO_2$ and one or more of $N_2$, $H_2$, $CH_4$, $O_2$, $H_2O$, $H_2S$, $SO_x$ and $NO_x$.

Further aspects and/or embodiments of the invention are discussed in more detail below.

BRIEF DESCRIPTION OF THE DRAWINGS

For the purpose of illustrating the invention, there are depicted in the drawings certain embodiments of the invention. However, the invention is not to be limited to the precise arrangements and instrumentalities of the embodiments depicted in the drawings.

Some figures contain colour representations or entities. Coloured versions of the figures are available upon request.

DETAILED DESCRIPTION OF THE INVENTION

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

A gas separation membrane in accordance with the invention comprises a porous substrate, a sealing polymer layer and a selective polymer layer. The membrane may therefore conveniently be referred to herein as a composite gas separation membrane or simply as a composite membrane.

The composite membrane is used for separating a target gas species from a mixture of gas species. As will be discussed in more detail below, the selective polymer layer employed will generally be dictated by the desired target gas species to be separated.

There is no particular limitation on the composition of the mixture of gas species that can be subjected to separation. Generally, the mixture of gas species will comprise a combination of two or more gas species selected from $N_2$, $H_2$, $CH_4$, $O_2$, $H_2O$, $H_2S$, $SO_x$, $NO_x$, HCl, He, and $CO_2$.

The target gas species will of course be selected from gas species present in the mixture of gases. The target gas species may be a combination of two or more individual gas species. Generally, the target gas species will be an individual gas species.

In one embodiment, the target gas species is selected from $N_2$, $H_2$, $CH_4$, $O_2$, $H_2O$, $H_2S$, $SO_x$, $NO_x$, HCl, He, and $CO_2$.

In a further embodiment, the target gas species is selected from $CO_2$, He, $O_2$ and $N_2$.

In another embodiment, the target gas species is $CO_2$ and the mixture of gas species comprises $CO_2$ and one more gases selected from $N_2$, $H_2$, $CH_4$, $O_2$, $H_2O$, $H_2S$, $SO_x$, $NO_x$, and He.

The porous substrate used in accordance with the invention has a first and second surface region between which the mixture of gas species will flow. In other words, the substrate contains pores or channels that enable the transport of gas between the first and second surface regions of the substrate. Accordingly, the porous substrate enables the mixture of gas species to flow through its porous structure.

Figure 1:
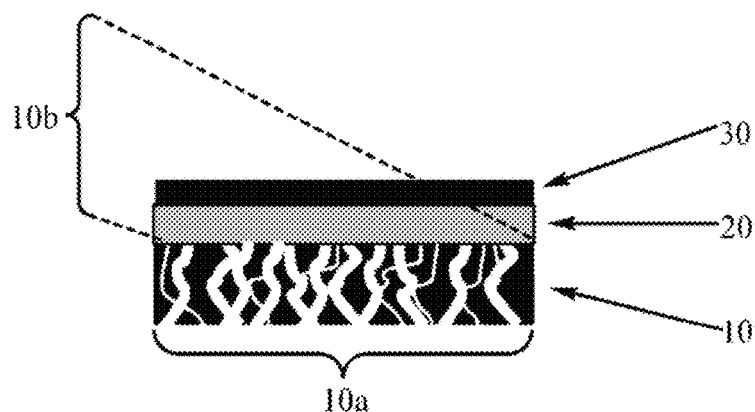
FIG. 1 illustrates a schematic cross section of a gas separation membrane in accordance with the invention.

To assist with further describing the nature of the composite membrane according to the invention, reference is made to FIG. 1 which illustrates a schematic cross section of the membrane. The membrane comprises a porous substrate (10) having a first surface region (10a) and a second surface region (10b). The porous nature of the substrate enables gas to flow between the first and second surface regions.

In one embodiment, the second surface region is a gas entry surface region and the first surface region is a gas exit surface region. In other words gas will flow from the second surface region in the direction of the first surface region.

The porous substrate will generally impart mechanical strength to the composite membrane. The porous substrate may therefore also be described as a porous substrate support structure or simply a porous support structure. Provided the porous substrate functions as herein described, there is no particular limitation on the composition from which the substrate is made.

If the porous substrate is to come into contact with a solvent during application of the sealing or selective polymer layers, the substrate should not be adversely effected by the solvent (e.g. it should not be soluble in the solvent).

Examples of suitable materials from which the porous substrate can be made include polymer and inorganic substrates.

In one embodiment, the porous substrate is inorganic.

Examples of suitable inorganic substrates include ceramics and metal oxides such as silica and alumina.

In one embodiment, the porous substrate is a polymer.

Suitable polymers from which the porous substrate may be made include, but are not limited to, poly(acrylonitrile) (PAN) homo- or co-polymers, polysulfone (PSf) homo- or co-polymers, polyethylene terephthalate (PET) homo- or co-polymers, and polyimides (PI) homo- or co-polymers.

For convenience, homo- or co-polymers may herein be referred to simply as "general polymer"-based polymers. For example, poly(acrylonitrile) homo- or co-polymers may herein be referred to simply as "PAN-based" polymers. Those skilled in the art will appreciate that a homo-polymer consists essentially of polymerised residues of one monomer type. A co-polymer will comprise polymerised residues of at least two monomer types.

Where the polymer is a copolymer, that polymer will comprise greater than 50 wt % of polymerised specified monomer residue. For example, by being a PAN co-polymer is meant that the co-polymer will comprise greater than 50 wt % of polymerised acrylonitrile monomer residues.

In one embodiment, the porous substrate is a porous poly(acrylonitrile) homo- or co-polymer substrate.

A PAN co-polymer in accordance with the invention will generally comprise 70-99 wt % polymerised residue of acrylonitrile and 1-30 wt % polymerised residue of one or more other ethylenically unsaturated co-monomers.

Provided the porous substrate can be fabricated into the composite membrane in accordance with the invention there is no particular limitation on the shape or dimensions which it may take. Generally, the porous substrate will have a thickness ranging from about 50 μm to about 200 μm.

The thickness of the porous substrate will generally be equivalent to the distance between the first and second surface region between which the mixture of gas species will flow.

In one embodiment, the porous substrate is in the form of a sheet material or a hollow fibre. Where the porous substrate is in the form of a hollow fibre, for avoidance of any doubt it will be appreciated that the wall structure of the hollow fibre presents as the porous substrate per se. In that case, the inner wall surface of the hollow fibre may be considered to be the first surface region of the porous substrate and the outer wall surface of the fibre may be considered to be the second surface region of the porous substrate.

An important feature of the porous substrate is that it contains pores that enables gas to flow through the substrate between the first and second surface regions. By the substrate being "porous" or the substrate containing "pores" is meant that the substrate contains voids or holes that are suitably arranged to provide channels within the substrate through which gas can flow.

The porous substrate is not intended to provide any form of selectivity function of a mixture of gases that passes through it. Accordingly, the pores within the substrate are to be sufficiently large enough for the mixture of gas species to pass through without undergoing any significant degree of separation. In other words, the porous substrate should provide little if no resistance to gas flow.

Generally, the pores that present at the surface of the porous substrate, and in particular at the first and second surface regions of the substrate, will have a largest cross sectional dimension ranging from about 0.1 nm to about 10 nm. Where the cross section of the pore at the surface of the substrate is circular in shape, the cross sectional largest dimension of the pore will of course be its diameter.

A sealing polymer layer, of a different composition to the porous substrate, forms a continuous coating across the second surface region of the substrate.

As noted above, the porous substrate has at the first and second surface regions open holes that represent the exposed pore structure and provide the channels through which gas will flow. By the sealing polymer layer forming "a continuous coating across the second surface region of the substrate" is meant that the coating presents as a continuous layer or film over the entire surface area of the second surface region such that holes in the second surface region become covered or sealed with the sealing polymer layer. In other words, the sealing polymer layer is presented on the second surface region of the substrate such that any gas passing through the combined porous substrate and sealing polymer composite structure must flow through the porous structure of the substrate and also permeate through the sealing polymer layer.

The sealing polymer layer is therefore permeable to the mixture of gas species. By being "permeable" is meant that a gas species can diffuse into, travel through and exit from the polymer matrix of the sealing polymer layer.

To further describe features of the gas separation membrane in accordance with the invention, reference is again made to FIG. 1 where a sealing of polymer layer (20) can be seen to form a continuous coating across the second surface region with the porous substrate (10b).

An important function of the sealing polymer layer is that it forms a continuous coating across the second surface region of the substrate. The sealing polymer layer does not merely coat the contours of the porous substrate but instead covers holes in the surface of substrate so as to form a continuous sealing polymer layer or film across the second surface region of a substrate. Those skilled in the art will appreciate that this form of coating layer is different from a coating that merely follows the contours of the substrate so as not to form a continuous polymer layer across the surface of the substrate (i.e. where the cross section of holes in the substrate surface are not covered or capped by the coating).

By providing a continuous coating across the second surface region of the substrate, the sealing polymer layer not only seals the porous surface structure of the substrate (i.e. covers over the holes in the substrate surface) but it also provides a continuous polymer layer upon which the selective polymer layer is presented. As will be discussed in more detail below, the continuous nature of the sealing polymer layer is particularly important in terms of being able to provide the gas separation membrane with a very thin, yet functional, selective polymer layer.

Provided the sealing polymer layer forms a continuous coating across the second surface region of a substrate there is no particular limitation as to the thickness of that layer. It will generally be desirable to provide the sealing polymer layer with a minimum thickness that achieves the continuous coating. The sealing polymer layer will typically have a thickness that is less than about 1 micron, or less than about 500 nm, or less than about 300 nm, or less than about 200 nm, or less than about 100 nm, or less than 50 nm for example ranging from about 10 nm to about 800 nm, or about 10 nm to about 500 nm, or about 10 nm to about 300 nm, or about 10 nm to about 200 nm, or about 10 nm to about 100 nm, or about 50 nm to about 300 nm, or about 100 nm to about 800 nm, or about 100 nm to about 500 nm, or about 100 nm to about 300 nm.

As noted above, the main function of the sealing polymer layer is to seal the surface porosity of the second surface region of the substrate. Because that surface of the substrate is sealed by the sealing polymer layer gas flow through the resulting composite structure will of course need to permeate through the sealing polymer layer. As will be discussed in more detail below, the main function of the selective polymer layer is to promote separation of gas species from a mixture of gas species. Accordingly, the sealing polymer layer will generally exhibit little if no differential permeability between gas species present within the mixture of gas species. In other words, the sealing polymer layer will generally exhibit low selectivity for gas species present within the mixture of gas species to be separated.

In one embodiment, the sealing polymer layer provides for a $CO_2$ permeance of at least 1000 GPU, or at least 3000 GPU, or at least 5000 GPU, and/or a selectivity of more than 7, or more than 10 for $CO_2/N_2$, and/or a selectivity of more than 3, or more than 5 for $CO_2/CH_4$.

Providing the sealing polymer layer with a different composition to the porous substrate advantageously enables the properties of each of these components to be optimised for their function, which in turn assists with optimising the overall performance of the resulting gas separation membrane. For example, the material used as the porous substrate can be optimised for its mechanical/support properties, whereas the material used as the sealing polymer layer can be optimised for its sealing, high permeance and low selectivity properties.

Examples of polymers that may be used as the sealing polymer layer include polysiloxanes and substituted polyacetylenes.

In one embodiment, the sealing polymer layer is a substituted polyacetylene or polysiloxane layer.

In one embodiment, the sealing polymer layer is a substituted polyacetylene layer.

Suitable substituted polyacetylenes include poly (1-(trimethylsilyl)-1-propyne) (PTMSP), poly (1-(dimethyl-n-propylsilyl)-1-propyne), poly (1-(dimethyl-n-butylsilyl)-1-propyne), poly (1-phenyl-1-propyne)poly (diphenylacetylene), poly (t-butylacetylene), poly (1-phenyl-2-p-trimethylsilyl-phenyl-acetylene), poly (1-phenyl-2-p-hydroxyphenyl-acetylene), co-polymers thereof, or any mixtures thereof.

In one embodiment, the sealing polymer layer is a polysiloxane layer.

Suitable polysiloxanes include poly(disubstituted siloxanes). Examples of suitable substituents for the siloxane include hydroxy, alkyl, aryl, alkyloxy and aryloxy.

In one embodiment, the polysiloxane is a poly(dialkyl siloxane). The dialkyl substituents will generally be C1-C6 alkyl substituents.

In another embodiment, the polysiloxane is poly(dimethyl siloxane) (PDMS).

The polymer matrix that makes up the sealing polymer layer may be crosslinked. Accordingly, in one embodiment the sealing polymer layer is a sealing crosslinked polymer layer.

The selective polymer layer is in the form of a crosslinked macromolecular film and is located on and covalently coupled to the sealing polymer layer. The selective polymer layer will generally be located on the sealing polymer layer such that any gas passing through the sealing polymer layer will necessarily also pass through the selective polymer layer.

To further assist with describing the structure of the gas separation membrane, reference is again made to FIG. 1 where the selective polymer layer (30) is located on the sealing polymer layer (20), which in turn forms a continuous coating across the second surface region of the substrate (10b).

By being in the form of a film, it will be appreciated that the selective polymer layer forms a continuous coating across the sealing polymer layer.

It will be appreciated from the discussion above that in the gas separation membrane according to the invention the porous substrate, sealing polymer layer and selective polymer layer are positioned such that gas passing through the membrane must pass through each of the porous substrate, the sealing polymer layer and the selective polymer layer.

By the selective polymer layer being in the form of a "crosslinked macromolecular film" is meant that the layer presents as a film having a polymer matrix formed from crosslinked macromolecules. Further detail on the nature of this layer and how it can be formed is outlined below.

The selective polymer layer is covalently coupled to the sealing polymer layer. In other words, the selective polymer is not merely adhered to the sealing polymer layer but rather is coupled to it on a molecular level.

The selective polymer layer has a higher permeability to the target gas species relative to other gas species present in the mixture of gas species that is to be subjected to separation. Accordingly, upon the mixture of gas species passing though the gas separation membrane there will be provided a separated gas composition wherein the concentration of the target gas species is higher in the separated gas composition compared with that in the mixture of gas species that was subjected to separation.

Provided the selective polymer layer has a suitable degree of selectivity for the target gas species, there is no particular limitation on the composition of the selective polymer layer. Those skilled in the art will of course be able to choose an appropriate selective polymer layer for use in a given gas separation process.

Examples of suitable selective polymer layers include a crosslinked polyethylene glycol layer, a crosslinked amorphous polyethylene oxide (HMA-PEO) layer, a crosslinked branched amorphous polyethylene oxide (BA-PEO) layer, a crosslinked polyimide (PI) layer, a crosslinked polyimide-block-polydimethylsiloxane (PI-b-PDMS) layer, a crosslinked polydimethylsiloxane-block-polyethylene oxide multiblock copolymer (PDMS-PEO)$_n$ layer, and a crosslinked polydimethylsiloxane-block-polyethylene glycol (PDMS-b-PEG) layer.

In one embodiment, the selective polymer layer is in the form of a crosslinked polyethylene glycol film and the gas separation membrane is for separating $CO_2$ from a mixture of gas species.

In another embodiment, the selective polymer layer exhibits selectivity of about 10 to about 60, or of about 20 to about 40.

Provided the selective polymer layer performs its function of promoting separation of the target gas species from the mixture of gas species there is no particular limitation on the thickness of the layer that can be used. However, an advantage of a gas separation membrane in accordance with the invention is that the selective polymer layer may be provided as an ultrathin layer. Minimising the thickness of this layer not only provides for improved properties in terms of both increased permeance and selectivity, but also in terms of reduced manufacturing cost.

The method of producing the gas separation membranes in accordance with the invention advantageously provides for the ability to present an ultrathin selective polymer layer, the likes of which can not be readily produced using conventional techniques.

Generally, the selective polymer layer will have a thickness of less than about 100 nm, or less than 80 nm, or less than 60 nm, or less than 50 nm, or less than 40 nm, or less than 30 nm. In one embodiment, the thickness of the selective polymer layer ranges from about 10 nm to about 100 nm, or from about 20 nm to about 80 nm, or from about 30 nm to about 70 nm, or from about 40 nm to about 60 nm.

In one embodiment, the selective polymer layer incorporates solid nanoparticles within its polymer matrix. Incorporating the nanoparticles into the selective polymer layer can advantageously improve the permeability and/or selectivity of the separation membrane.

There is no particular limitation on the composition of the solid nanoparticles that can be incorporated into the selective polymer layer. Examples of suitable solid nanoparticles include, silica, alumina, metal organic frameworks (MOF's), iron/dopamine ($Fe(DA)_x$), or combinations thereof, where x is an integer ranging from 1-20, or 1-15, or 1-12, or 1-10.

Reference herein to solid "nanoparticles" in indented to mean solid particles having a largest dimension of no grater than 100 nm. Generally, the solid nanoparticles will have a largest dimension ranging from about 5 nm to about 80 nm, or about 10 nm to about 60 nm, or about 10 nm to about 50 nm, or about 20 nm to about 50 nm.

The gas separation membranes in accordance with the invention provide for excellent permeance and selectivity.

In one embodiment, the gas separation membrane has a $CO_2$ permeance of at least 1,000 GPU, for example from about 1000 to about 5000 GPU, and a $CO_2/N_2$ selectivity of at least 20, for example from about 20 to about 60.

In another embodiment, the gas separation membrane has a $CO_2$ permeance of at least 1,000 GPU, for example from about 1000 to about 5000 GPU, and a $CO_2/CH_4$ selectivity of at least 15, for example from about 15 to about 60.

The present invention also provides a method of preparing the gas separation membrane. The method comprises providing the porous substrate having the sealing polymer layer applied to the second surface region.

In one embodiment, the method further comprises providing a porous substrate having a first and second surface region between which the mixture of gas will flow, and applying to the substrate so as to form a continuous coating across the second surface region a sealing polymer layer that is permeable to the mixture of gas species.

The sealing polymer layer may be applied to the second surface region of the substrate by any suitable means. For example, the sealing polymer layer may be applied by way of spin coating, knife coating or dip coating.

Conventional techniques and equipment can advantageously be used in applying the sealing polymer layer to the porous substrate.

Suitable polymers that may be used as the sealing polymer layer in accordance with the invention are as herein described.

In one embodiment, the sealing polymer layer is a sealing crosslinked polymer layer. In that case, the polymer will generally be applied to the porous substrate and subsequently be crosslinked. For example, a polysiloxane such as polydimethyl siloxane may be end functionalised with amine groups and coated onto the porous substrate together with a suitable crosslinking agent, for example trimesoyl chloride (TMC). Crosslinking of the polysiloxane can then be promoted so as to form the sealing crosslinked polymer layer.

Crosslinking of the sealing of polymer layer may be promoted by any suitable means known by those skilled in the art. In one embodiment, a sealing crosslinked polymer layer is formed on the second surface region of the substrate by applying to that region polymer and a crosslinking agent.

As alluded to above, the sealing polymer layer is selected such that it is of different composition to the porous substrate.

An important feature of the method of the invention is that the sealing polymer layer presents at its outermost surface a plurality of living polymerisation moieties that are covalently bound to polymer chains that form part of the sealing polymer layer.

As will be discussed in more detail below, the plurality of living polymerisation moieties facilitate formation of the selective polymer layer.

By the living polymerisation moieties being presented on the "outermost surface" of the sealing polymer layer is therefore meant that the living polymerisation moieties present on the surface of the sealing polymer layer adjacent the interface between the porous substrate and the sealing polymer layer.

By the living polymerisation moieties are being "presented" at the outermost surface is meant that the moieties are available to participate in and control the polymerisation of macromolecules having a plurality of polymerisable functional groups.

There is no particular limitation on the process by which the living polymerisation moieties are presented at the outermost surface of the sealing polymer layer. For example, the bulk polymer that is used to form the sealing polymer layer may have living polymerisation moieties covalently bound thereto and will therefore inherently present these moieties at the outermost surface of that polymer layer.

Alternatively, the sealing polymer layer may be applied to the porous substrate stepwise. For example, a polymer that does not contain living polymerisation moieties covalently bound thereto may be first applied to the second surface region of the porous substrate as an intermediate sealing polymer layer. Polymer having living polymerisation moieties covalently bound thereto may then be applied onto the intermediate sealing polymer layer so as to collectively form the sealing polymer presenting at its outermost surface a plurality of living polymerisation moieties that are covalently bound to polymer chains that form part of the sealing polymer layer.

Accordingly, in one embodiment, the sealing polymer layer is applied to the second surface region of the substrate in a multi-step process, wherein the last step in the process comprises applying polymer having a plurality of living polymerisation moieties covalently bound thereto.

As used herein, a "living polymerisation moiety(ies)" is intended to mean a moiety or group that can participate in and control the living polymerisation of one or more monomers or macromers so as to form living polymer.

Those skilled in the art will appreciate that "living polymerisation" is a form of addition polymerisation whereby chain growth propagates with essentially no chain transfer and essentially no termination that give rise to dead polymer chains. By a "dead polymer chain" is meant one that can not undergo further addition of monomers Living polymerisation moieties suitable for use in accordance with the invention include, but are not limited to, those which promote living polymerisation techniques selected from ionic polymerisation, controlled radial polymerisation (CRP), and ring opening metathesis polymerisation (ROMP). Examples of CRP include, but are not limited to, iniferter polymerisation, stable free radical mediated polymerisation (SFRP), atom transfer radical polymerisation (ATRP), and reversible addition fragmentation chain transfer (RAFT) polymerisation.

Living ionic polymerisation is a form of addition polymerisation whereby the kinetic-chain carriers are ions or ion pairs. The polymerisation proceeds via anionic or cationic kinetic-chain carriers. In other words, the propagating species will either carry a negative or positive charge, and as such there will also be an associated counter cation or counter anion, respectively. For example, in the case of anionic polymerisation, the living polymerisation moiety might be represented as $—I^-M^+$ where I represents an organo-anion (e.g. an optionally substituted alkyl anion) and M represents an associated countercation, or in the case of living cationic polymerisation, the living polymerisation moiety might be represented as where $—I^+M^-$; where I represents an organo-cation (e.g. an optionally substituted alkyl cation) and M represents an associated counteranion. In other words, the living ionic polymerisation moiety $—I^-M^+$ or $—I^+M^-$ will be covalently bound to polymer that forms at least a part of the sealing polymer layer. Suitable moieties for conducting anionic and cationic living polymerisation are well known to those skilled in the art.

In an embodiment of the invention, the living polymerisation moiety promotes CRP, or in other words the living polymerisation moiety is a CRP moiety.

Iniferter polymerisation is a well known form of CRP, and is generally understood to proceed by a mechanism illustrated below in Scheme 1.

Scheme 1: General mechanism of controlled radical polymerisation with iniferters.

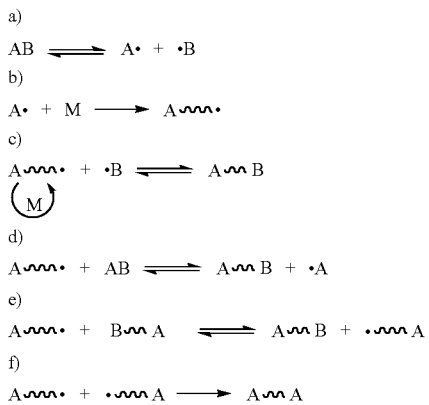

With reference to Scheme 1, the iniferter AB dissociates chemically, thermally or photochemically to produce a reactive radical species A and generally a relatively stable radical species B (for symmetrical iniferters the radical species B will be the same as the radical species A) (step a). The radical species A can initiate polymerisation of monomer M (in step b) and may be deactivated by coupling with radical species B (in step c). Transfer to the iniferter (in step d) and/or transfer to dormant polymer (in step e) followed by termination (in step f) characterise iniferter chemistry.

As a living polymerisation moiety used in accordance with the present invention, an iniferter moiety may therefore be represented as —AB or —BA, where AB or BA can dissociate chemically, thermally or photochemically as illustrated above in Scheme 1. In other words, the iniferter moiety —AB or —BA will be covalently bound to polymer that forms at least a part of the sealing polymer layer. Suitable moieties for conducting iniferter polymerisation are well known to those skilled in the art, and include, but are not limited to, dithiocarbonate, disulphide, and thiuram disulphide moieties.

In a further embodiment of the invention, the living polymerisation moiety promotes SFRP, or in other words the living polymerisation moiety is a SFRP moiety. As suggested by its name, this mode of radical polymerisation involves the generation of a stable radical species as illustrated below in Scheme 2.

Scheme 2: General mechanism of controlled radical polymerisation with stable free radical mediated polymerisation.

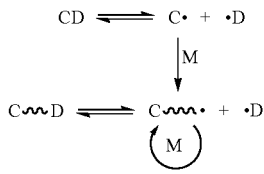

With reference to Scheme 2, SFRP moiety CD dissociates to produce an active radical species C and a stable radical species D. The active radical species C reacts with monomer M, which resulting propagating chain may recombine with the stable radical species D. Unlike iniferter moieties, SFRP moieties do not provide for a transfer step.

As a living polymerisation moiety used in accordance with the present invention, an SFRP moiety may therefore be represented as —CD or —DC, where CD or DC can dissociate chemically, thermally or photochemically as illustrated above in Scheme 2. In other words, the SFRP moiety —CD or —DC will be covalently bound to polymer that forms at least a part of the sealing polymer layer. Suitable moieties for conducting SFRP are well known to those skilled in the art, and include, but are not limited to, moieties capable of generating phenoxy and nitroxy radicals. Where the moiety generates a nitroxy radical, the polymerisation technique is more commonly known as nitroxide mediated polymerisation (NMP).

Examples of SFRP moieties capable of generating phenoxy radicals include those comprising a phenoxy group substituted in the 2 and 6 positions by bulky groups such as tert-alkyl (e.g. t-butyl), phenyl or dimethylbenzyl, and optionally substituted at the 4 position by an alkyl, alkyloxy, aryl, or aryloxy group or by a heteroatom containing group (e.g. S, N or O) such dimethylamino or diphenylamino group. Thiophenoxy analogues of such phenoxy containing moieties are also contemplated.

SFRP moieties capable of generating nitroxy radicals include those comprising the substituent $R^1R^2N-O-$, where $R^1$ and $R^2$ are tertiary alkyl groups, or where $R^1$ and $R^2$ together with the N atom form a cyclic structure, preferably having tertiary branching at the positions α to the N atom. Examples of such nitroxy substituents include 2,2,5,5-tetraalkylpyrrolidinoxyl, as well as those in which the 5-membered hetrocycle ring is fused to an alicyclic or aromatic ring, hindered aliphatic dialkylaminoxyl and iminoxyl substituents. A common nitroxy substituent employed in SFRP is 2,2,6,6-tetramethyl-1-piperidinyloxy.

In another embodiment of the invention, the living polymerisation moiety promotes ATRP, or in other words the living polymerisation moiety is an ATRP moiety. ATRP generally employs a transition metal catalyst to reversibly deactivate a propagating radical by transfer of a transferable atom or group such as a halogen atom to the propagating polymer chain, thereby reducing the oxidation state of the metal catalyst as illustrated below in Scheme 3.

Scheme 3: General mechanism of controlled radical polymerisation with atom transfer radical polymerisation.

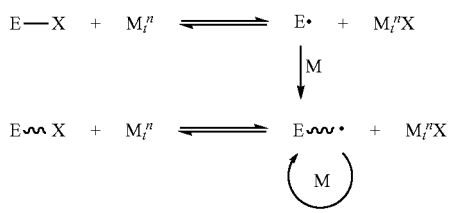

With reference to Scheme 3, a transferable group or atom (X, e.g. halide, hydroxyl, $C_1$-$C_6$-alkoxy, cyano, cyanato, thiocyanato or azido) is transferred from the organic compound (E) (which may represent the polymer) to a transition metal catalyst ($M_t$, e.g. copper, iron, gold, silver, mercury, palladium, platinum, cobalt, manganese, ruthenium, molybdenum, niobium, or zinc) having oxidation number (n), upon which a radical species is formed that initiates polymerisation with monomer (M). As part of this process, the metal complex is oxidised ($M_t^{n+1}X$). A similar reaction sequence is then established between the propagating polymer chain and the dormant X end-capped polymer chains.

As a living polymerisation moiety used in accordance with the present invention, an ATRP moiety may therefore be represented as —EX, where E is an organic group (e.g. optionally substituted alkyl, optionally substituted aryl, optionally substituted alkylaryl, or the polymer chain) and X is an atom or group that can participate in a redox cycle with a transition metal catalyst to reversibly generate a radical species and the oxidised metal catalyst as illustrated above in Scheme 3. In other words, the ATRP moiety -EX or simply -X will be covalently bound to polymer that forms at least a part of the sealing polymer layer.

Although ATRP requires the presence of a transition metal catalyst to proceed, it is not intended that the transition metal catalyst form part of the living polymerisation moiety per se used in accordance with the invention.

In a further embodiment of the invention, the living polymerisation moiety promotes RAFT polymerisation, or in other words the living polymerisation moiety is a RAFT moiety. RAFT polymerisation is well known in the art and is believed to operate through the mechanism outlined below in Scheme 4.

Scheme 4: General mechanism of controlled radical polymerisation with reversible addition fragmentation chain transfer polymerisation.

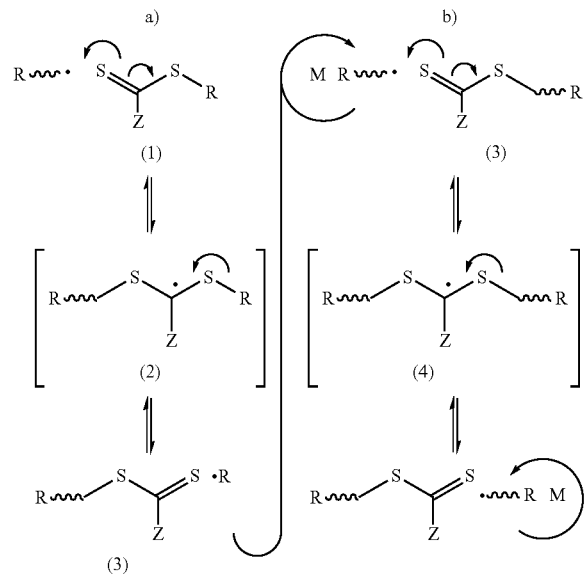

With reference to Scheme 4, RAFT polymerisation is believed to proceed through initial reaction sequence (a) that involves reaction of a RAFT moiety (1) with a propagating radical. The labile intermediate radical species (2) that is formed fragments to form a temporarily deactivated dormant polymer species (3) together a radical (R) derived from the RAFT moiety. This radical can then promote polymerisation of monomer (M), thereby reinitiating polymerisation. The propagating polymer chain can then react with the dormant polymer species (3) to promote the reaction sequence (b) that is similar to reaction sequence (a). Thus, a labile intermediate radical (4) is formed and subsequently fragments to form again a dormant polymer species together with a radical which is capable of further chain growth.

RAFT moieties suitable for use in accordance with the invention comprise a thiocarbonylthio group (which is a divalent moiety represented by: —C(S)S—). Examples of RAFT moieties are described in Moad G.; Rizzardo E.; Thang S H. *Polymer* 2008, 49, 1079-1131 (the contents of which are incorporated herein by reference) and include xanthates, dithioesters, dithiocarbonates, dithiocarbanates and trithiocarbonates.

A RAFT moiety suitable for use in accordance with the invention may be represented by general formula (1) shown in Scheme 4 above, where the Z or R groups represent polymer that forms at least a part of the sealing polymer layer, or where the Z or R groups are themselves covalently bound to the polymer that forms at least a part of the sealing polymer layer. Where the Z or R groups are not the polymer per se, they are selected from groups known in the art to enable the moiety to undergo RAFT polymerisation.

In a further embodiment of the invention, the living polymerisation moiety promotes ROMP, or in other words the living polymerisation moiety is a ROMP moiety, commonly referred to in the art as a ROMP catalyst. ROMP polymerisation is well known in the art and is believed to operate through the mechanism outlined below in Scheme 5.

Scheme 5: General mechanism of ROMP.

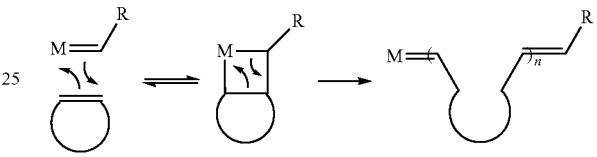

With reference to Scheme 5, ROMP typically involves reaction between an alkylidene catalyst and a cyclic olefin. Reaction between the catalyst and cyclic olefin is believed to provide for a metallacyclobutane intermediate which ring opens to promote formation of the polymer chain. Suitable alkylidene catalysts for performing ROMP are well known to those skilled in the art and incorporate a metal atom (M) that may, for example, be selected from ruthenium, molybdenum, titanium, tungsten, osmium and iron. Suitable alkylidene catalysts also include the well known Grubbs' catalyst or Schrock catalyst. Cyclic olefins suitable for use in ROMP are also well known to those skilled in the art and include, for example, norbornene and cyclopentene structures. A ROMP moiety or catalyst suitable for use in accordance with the invention may be represented by the metal alkylidene structure shown in Scheme 5 above, where M represents a suitable metal species or metal complex and R represents the polymer that forms at least part of the sealing polymer layer to which the moiety is covalently bound, or R is a suitable functional group that itself is covalently bounded to the polymer that forms at least part of the sealing polymer layer to which the moiety is covalently bound. Where R is itself not the polymer, it will be selected from a group known in the art to enable the moiety to participate in ROMP.

Suitable living polymerisation moieties may be covalently coupled to polymer chains that form part of the sealing polymer layer by techniques known by those skilled in the art.

An important feature of the method of the present invention is forming on the outermost surface of the sealing polymer layer a selective polymer layer in the form of a crosslinked macromolecular film by polymerising, under the control of the living polymerisation moieties, macromolecules having a plurality of polymerisable functional groups.

By polymerising the macromolecules "under the control" of the living polymerisation moieties is meant that polymerisation of the macromolecules precedes with living polymerisation characteristics that are mediated or controlled by the living polymerisation moieties.

An important feature to attaining the selective polymer layer in the form of a crosslinked macromolecular film is the polymerisation of macromolecules having a plurality of polymerisable functional groups. Such macromolecules are in effect oligomers or polymers in their own right having two or more polymerisable functional groups and may also be referred to herein as "crosslinking macromers", or "macro-crosslinkers".

As used herein, the term "macromolecule" is intended to mean a polymer or oligomer having a molecular weight of at least 300 Daltons (Da), for example from 300 to about 50,000 Da, as determined by gel permeation chromatography (GPC). The macromolecules may be homopolymers (or homo oligomers) or copolymers (or co-oligomers).

The nature of the polymerisable functional groups of the macro-crosslinkers will of course depend upon the type of living polymerisation being employed. Generally, the polymerisable functional groups will be ethylenically unsaturated groups. Those skilled in the art will appreciate that polymerisation of macromers having a plurality of polymerisable functional groups will generally result in the formation of a crosslinked polymeric network.

In one embodiment, the macromolecules have a plurality of polymerisable ethylenically unsaturated groups.

Where the macro-crosslinker undergoes ROMP to form the selective polymer layer, those skilled in the art will appreciate that the plurality of polymerisable functional groups will present within the form of a suitable cyclic olefin structure, for example a norbornene derivative. In other words the cyclic olefin will present pendant from the polymer or oligomer chain of the macro-crosslinker.

The macro-crosslinkers used will of course be chosen so as to impart the desired selectivity properties to the resulting crosslinked macromolecular film. Examples of macro-crosslinkers that may be used in accordance with the invention include an oligomer or polymer of polyethylene glycol, polyethylene oxide, polyimide (PI), polyimide-block-polydimethylsiloxane (PI-b-PDMS), polydimethylsiloxane-block-polyethylene oxide (PDMS-PEO)$_n$, polydimethylsiloxane-block-polyethylene glycol (PDMS-b-PEG), and combinations thereof, where each polymer listed has a plurality of polymerisable functional groups covalently bound thereto.

In one embodiment, the polymerisable functional groups are pendant and/or terminal ethylenically unsaturated groups.

Generally, the macro-crosslinker will have at least 3, or at least 5, or at least 10, or at least 15, or at least 20 polymerisable functional groups. In one embodiment, the polymerisable functional groups are present on (i.e. covalently coupled to) about 5% to about 20%, or about 10% of the polymerised monomer residues that form the macro-crosslinker.

The macro-crosslinker may be linear or branched (such as a star macro-crosslinker, or a brush macro-crosslinker).

The macro-crosslinker may be a homo- or co-polymer.

Where the macro-crosslinker is co-polymer, the polymerisable functional groups may be present on (i.e. covalently coupled to) one or more of the co-monomer types present.

The macro-crosslinker used in accordance with the invention may also be polymerised in combination with one or more monomers.

Monomers that may be polymerised in combination with the macro-crosslinker include ethylenically unsaturated monomers.

Examples of suitable ethylenically unsaturated monomers include, but are not limited to, those of general formula (I):

where U and W are independently selected from —$CO_2H$, —$CO_2R^2$, —$COR^2$, —$CSR^2$, —$CSOR^2$, —$COSR^2$, —$CONH_2$, —$CONHR^2$, —$CONR^2_2$, hydrogen, halogen and optionally substituted $C_1$-$C_4$ alkyl, or U and W form together a lactone, anhydride or imide ring that may itself be optionally substituted; where the optional substituents are independently selected from hydroxy, —$CO_2H$, —$CO_2R^2$, —$COR^2$, —$CSR^2$, —$CSOR^2$, —$COSR^2$, —CN, —$CONH_2$, —$CONHR^2$, —$CONR^2_2$, —$OR^2$, —$SR^2$, —$O_2CR^2$, —$SCOR^2$, and —$OCSR^2$;

where V is selected from hydrogen, $R^2$, —$CO_2H$, —$CO_2R^2$, —$COR^2$, CN, —$CSR^2$, —$CSOR^2$, —$COSR^2$, —$CONH_2$, —$CONHR^2$, —$CONR^2_2$, $NHC(O)R^2$, $NR^2C(O)R^2$, $PO(OR^2)_3$, —$OR^2$, —$SR^2$, —$O_2CR^2$, —$SCOR^2$, —$OCSR^2$ and halogen;

where the or each $R^2$ is independently selected from optionally substituted $C_1$-$C_{22}$ alkyl, optionally substituted $C_2$-$C_{22}$ alkenyl, $C_2$-$C_{22}$ optionally substituted alkynyl, optionally substituted aryl, optionally substituted heteroaryl, optionally substituted carbocyclyl, optionally substituted heterocyclyl, optionally substituted aralkyl, optionally substituted heteroarylalkyl, optionally substituted alkaryl, and optionally substituted alkylheteroaryl; preferred optional substituents for $R^2$ include those selected from alkyleneoxidyl (epoxy), hydroxy, alkoxy, acyl, acyloxy, formyl, alkylcarbonyl, carboxy, sulfonic acid, alkoxy- or aryloxy-carbonyl, isocyanato, cyano, silyl, halo, amino, including salts and derivatives thereof.

Specific examples of ethylenically unsaturated monomers include, but are not limited to, maleic anhydride, N-alkylmaleimide, N-arylmaleimide, dialkyl fumarate and cyclopolymerisable monomers, acrylate and methacrylate esters, acrylic and methacrylic acid, styrene and substituted styrene derivatives, acrylamide, methacrylamide, and methacrylonitrile, mixtures of these monomers, and mixtures of these monomers with other monomers.

Other specific examples of ethylenically unsaturated monomers include, but are not limited to, the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-isopropylacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylamino styrene (all isomers), alpha-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropylacrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, ethylene, and chloroprene.

Where the selective polymer layer is to also incorporate within its polymeric matrix solid nanoparticles, the macromolecules having a plurality of polymerisable functional groups that are polymerised to form that layer may also comprise the nanoparticles as described herein.

In one embodiment, the macromolecules having a plurality of polymerisable functional groups that are polymerised to form selective polymer layer comprise solid nanoparticles.

Where radical polymerisation techniques are used in accordance with the invention, the polymerisation may require initiation from a source of free radicals. The source of initiating radicals can be provided by any suitable method of generating free radicals, such as the thermally induced homolytic scission of suitable compound(s) (e.g. thermal initiators such as peroxides, peroxyesters, or azo compounds), the spontaneous generation from monomers (e.g. styrene), redox initiating systems, photochemically (e.g. UV radiation), or high energy radiation such as electron beam, X- or γ-radiation. The initiating system is chosen such that under the reaction conditions employed there is no substantial adverse interaction of the initiator or the initiating radicals with the selected living polymerisation moiety. The initiator will generally be selected to have the requisite solubility in the reaction medium.

Those skilled in the art will appreciate that in some cases the selected living polymerisation moiety may in itself be capable of providing the source of initiating radicals. For example, an iniferter moiety may be used to provide the source of initiating radicals.

Where a thermal initiator is used, it will generally be selected to have an appropriate half life at the temperature of polymerisation. Specific examples of thermal initiators include, but are not limited to, the following compounds:
2,2'-azobis(isobutyronitrile), 2,2'-azobis(2-cyanobutane), dimethyl 2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramidine), 2,2'-azobis{2-methyl-N-[1,1-bis(hydroxymethyl)-2-hydroxyethyl]propionamide}, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide) dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite.

Where used, photochemical initiator systems will generally be selected to have the requisite solubility in the reaction medium and to also have an appropriate quantum yield for radical production under the conditions of polymerisation. Specific examples of such initiator systems include, but are not limited to, benzoin derivatives, benzophenone, acyl phosphine oxides, and photo-redox systems.

Where a redox initiator system is used, it will generally be selected to have the requisite solubility in the reaction medium and to also have an appropriate rate of radical production under the conditions of polymerisation. Specific examples of such initiating systems include, but are not limited to, combinations of the following oxidants and reductants:

oxidants: potassium, peroxydisulfate, hydrogen peroxide, t-butyl hydroperoxide.

reductants: iron (II), titanium (III), potassium thiosulfite, potassium bisulfite.

Other suitable initiating systems are described in well known texts. See, for example, Moad and Solomon "the Chemistry of Free Radical Polymerisation", Pergamon, London, 1995, pp 53-95.

There is no particular limitation on the technique employed to prepare the crosslinked macromolecular film used in accordance with the invention. One technique for forming the crosslinked macromolecular film used in accordance with the invention is commonly referred in the art as continuous assembly of polymer (CAP). This technique is generally disclosed in U.S. Pat. No. 8,496,997.

The CAP process advantageously enables precise control over the formation of the selective polymer layer on the sealing polymer layer. Notably, the CAP process enables an ultrathin selective polymer layer to be effectively and efficiently provided in the form of a continuous substantially defect free crosslinked macromolecular film. Minimising the film thickness of the selective polymer layer advantageously enhances the properties of the resulting gas separation membrane and also enables the membranes to be produced in a more cost effective manner.

Those skilled in the art will appreciate that selective polymer layers of conventional gas separation membranes are typically formed by spin coating, dip coating, slot die coating or applied using doctor blades. Such techniques are limited in their ability to provide for ultrathin films and/or defect free (i.e. no pin holes) films. Use of the porous substrate and sealing polymer layer in combination with the CAP process according to the present invention has been found to advantageously not only afford gas separation membranes with improved properties but also overcome a number of manufacturing concerns associated with conventional techniques for preparing gas separation membranes.

The CAP process is an excellent technique for forming crosslinked macromolecular film. The CAP approach may be described as a combination of both grafting-from and grafting-to processes. CAP offers the advantage of combining the robustness of the grafting-from approach to polymerise across the polymerisable functional groups of the macromer forming a crosslinked polymer structure, and the compositional flexibility of the grafting-to approach to fabricate compositionally unique films that are not readily produced using conventional grafting-from methods alone.

Figure 2:
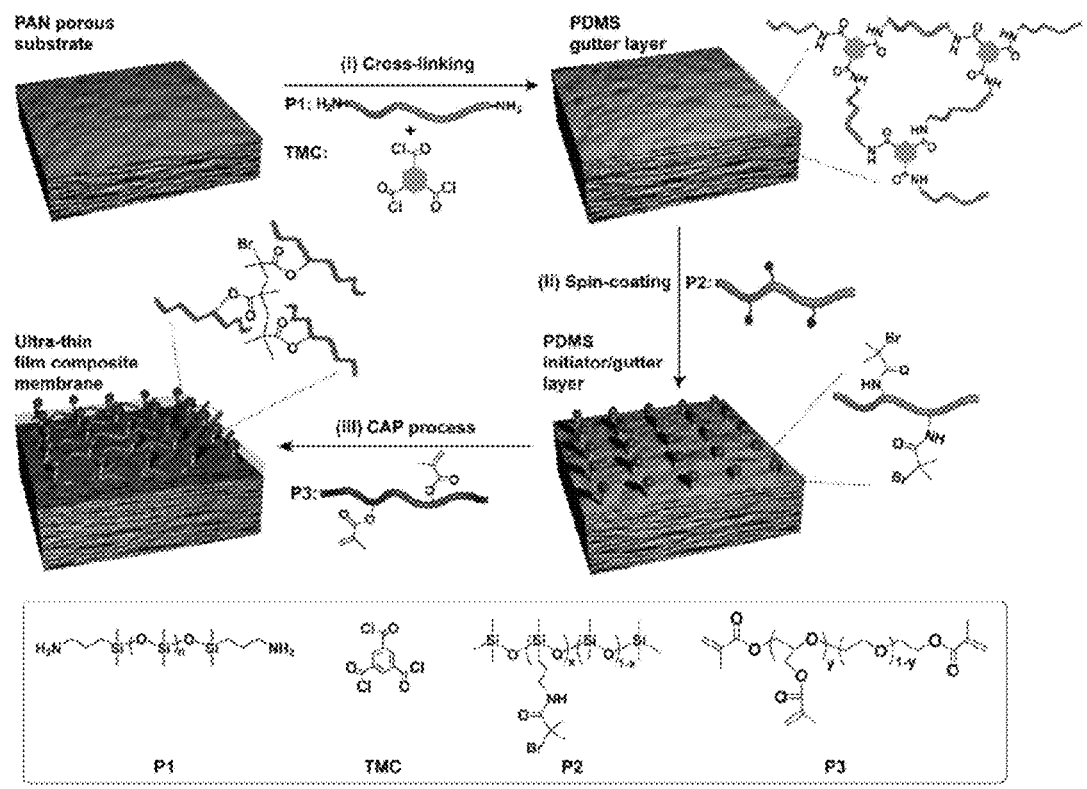
FIG. 2 illustrates a scheme for preparing a gas separation membrane according to the method of the invention.
Figure 3:
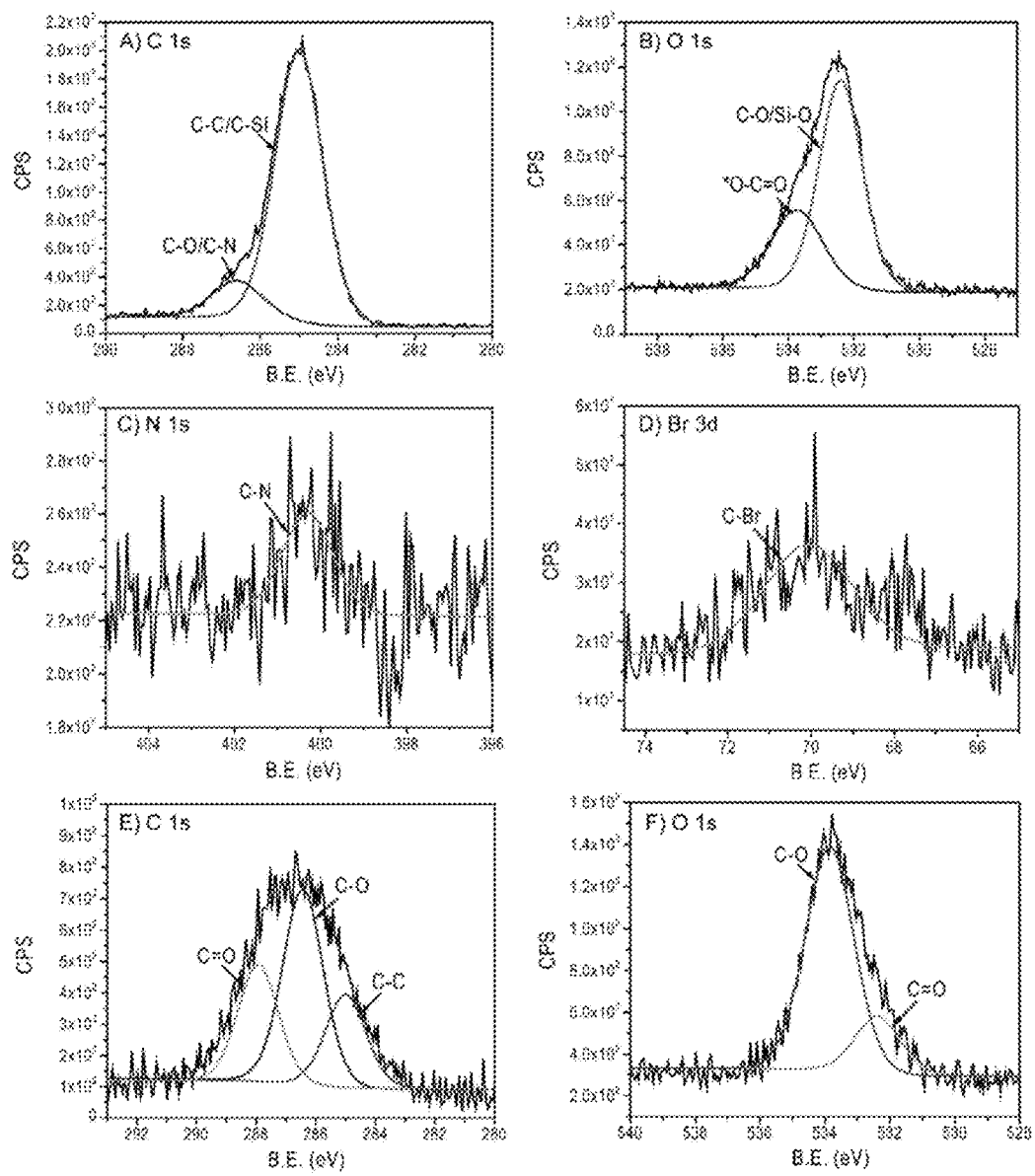
FIG. 3 illustrates high resolution XPS spectra of C 1s (A), O 1s (B), N 1s (C), Br 3d (D) for the cross-linked PDMS prelayer and of C 1s (E), O 1s (F) for ultra-thin CAP film prepared in Example 2.
Figure 4:
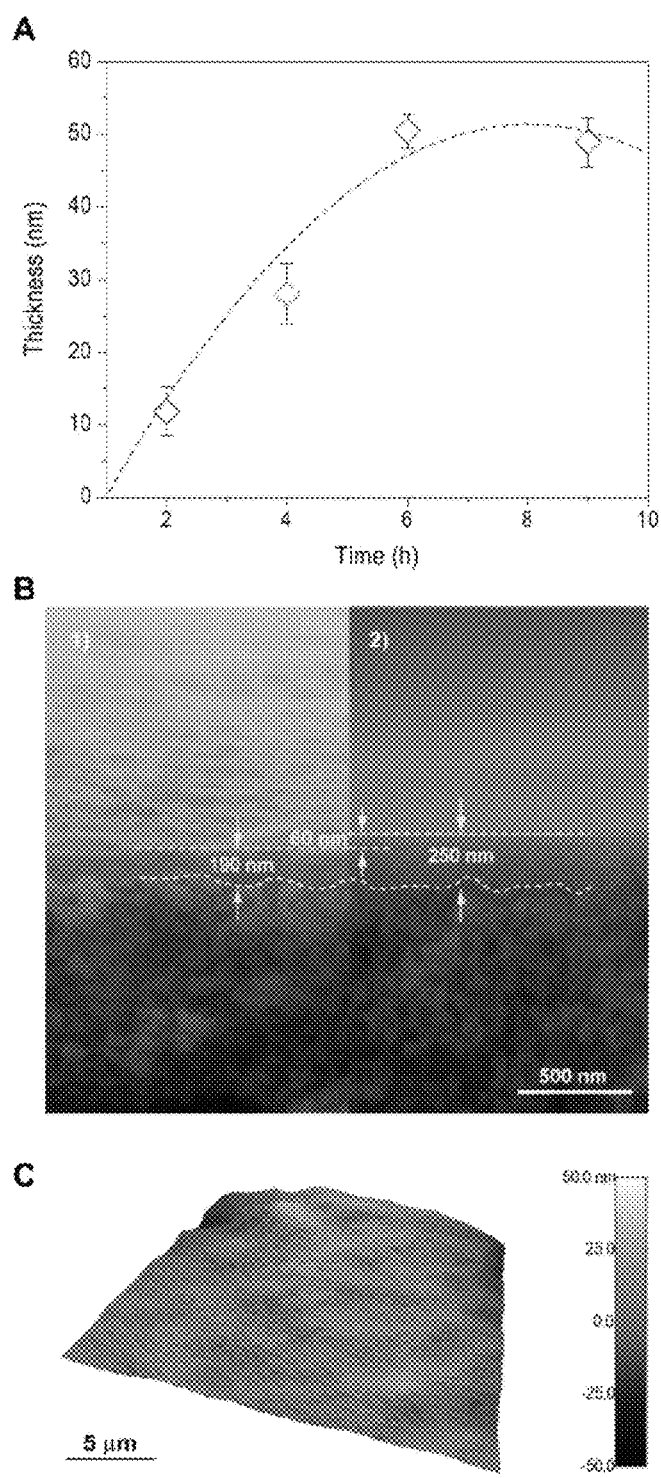
FIG. 4 illustrates the evolution of the ultra-thin CAP film formation on silicon wafers in the Example 1 as a function of the polymerization time, as determined by z-profiles of AFM measurement. (B) SEM microphotographs of PDMS prelayer (1) and ultra-thin CAP films CAP-6 (2), respectively (the interface between thin CAP film and intermediate PDMS prelayer cannot be distinguished, but by superimposing PDMS prelayer and multilayer thin film membrane, the thickness of ultra-thin PEO film as top layer can be estimated). (C) 3D height mode AFM image of the ultra-thin CAP film on PAN substrate after 6 h polymerisation.
Figure 5:
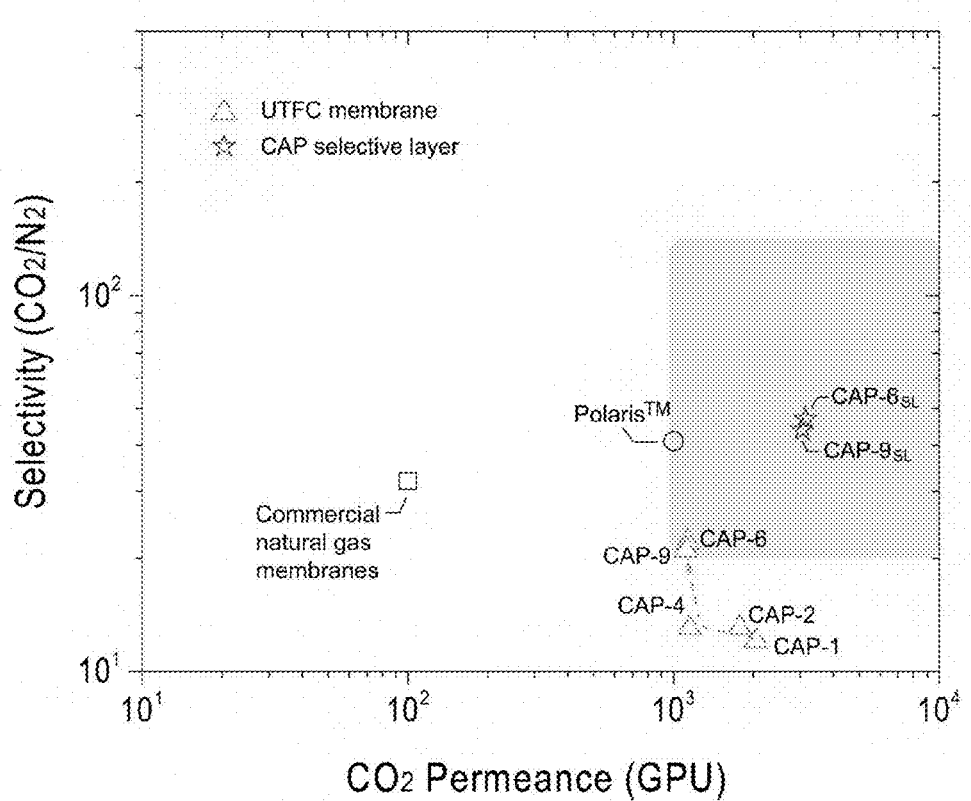
FIG. 5 illustrates $CO_2/N_2$ selectivity versus $CO_2$ permeance plot comparing the performance of UTFC membranes (CAP1 to CAP9) and their CAP selective layers of $CAP6_{SL}$ and $CAP9_{SL}$ prepared in Example 2 with commercial natural gas membranes and the Polaris™ membrane. The target area is that proposed by Merkel et al. for post combustion capture of $CO_2$.
Figure 6:
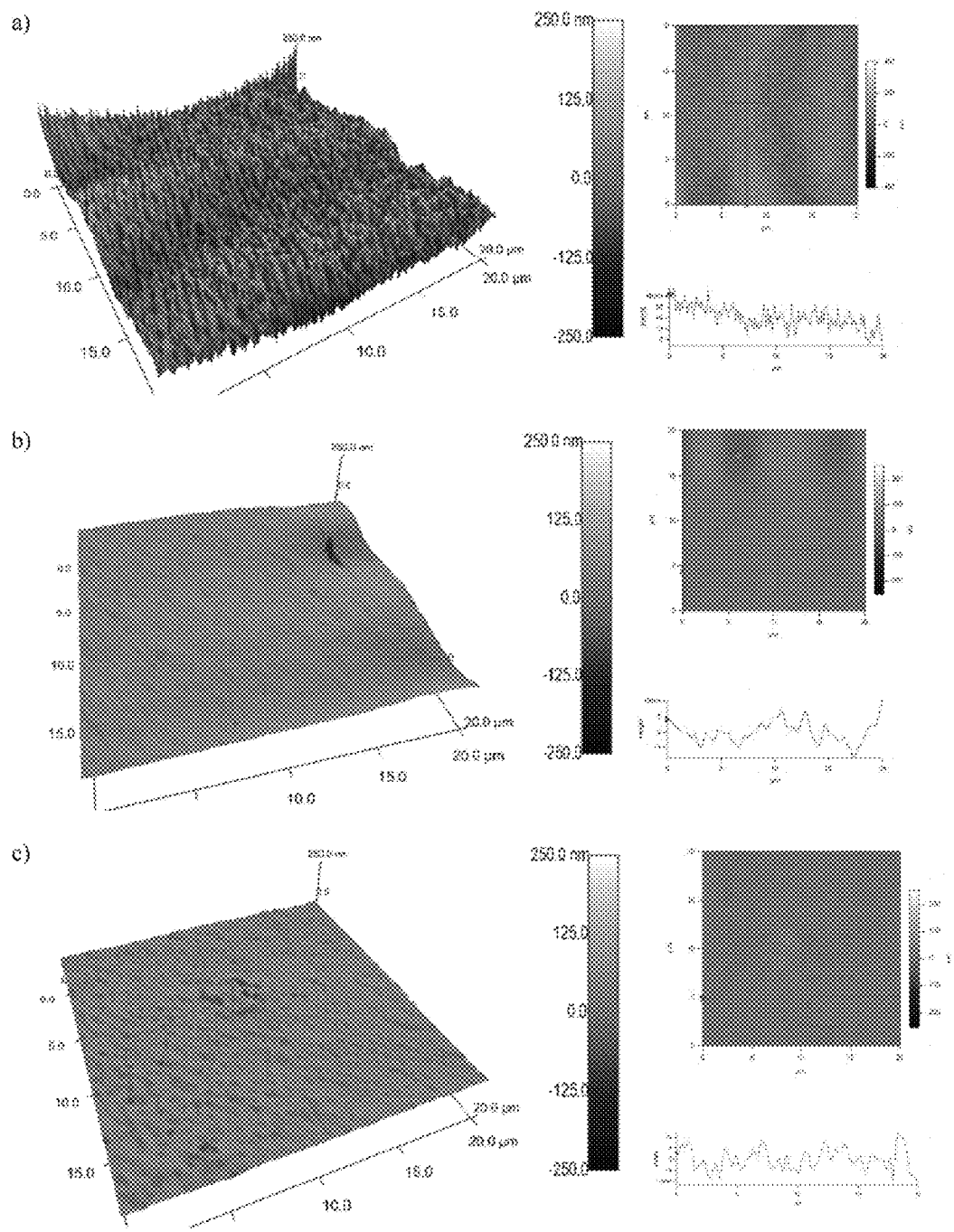
FIG. 6 illustrates AFM images of a) porous PAN substrate, b) PDMS-g-Br coated on porous PAN substrate and c) PEG9 UTFC membrane prepared in Example 4.
Figure 7:
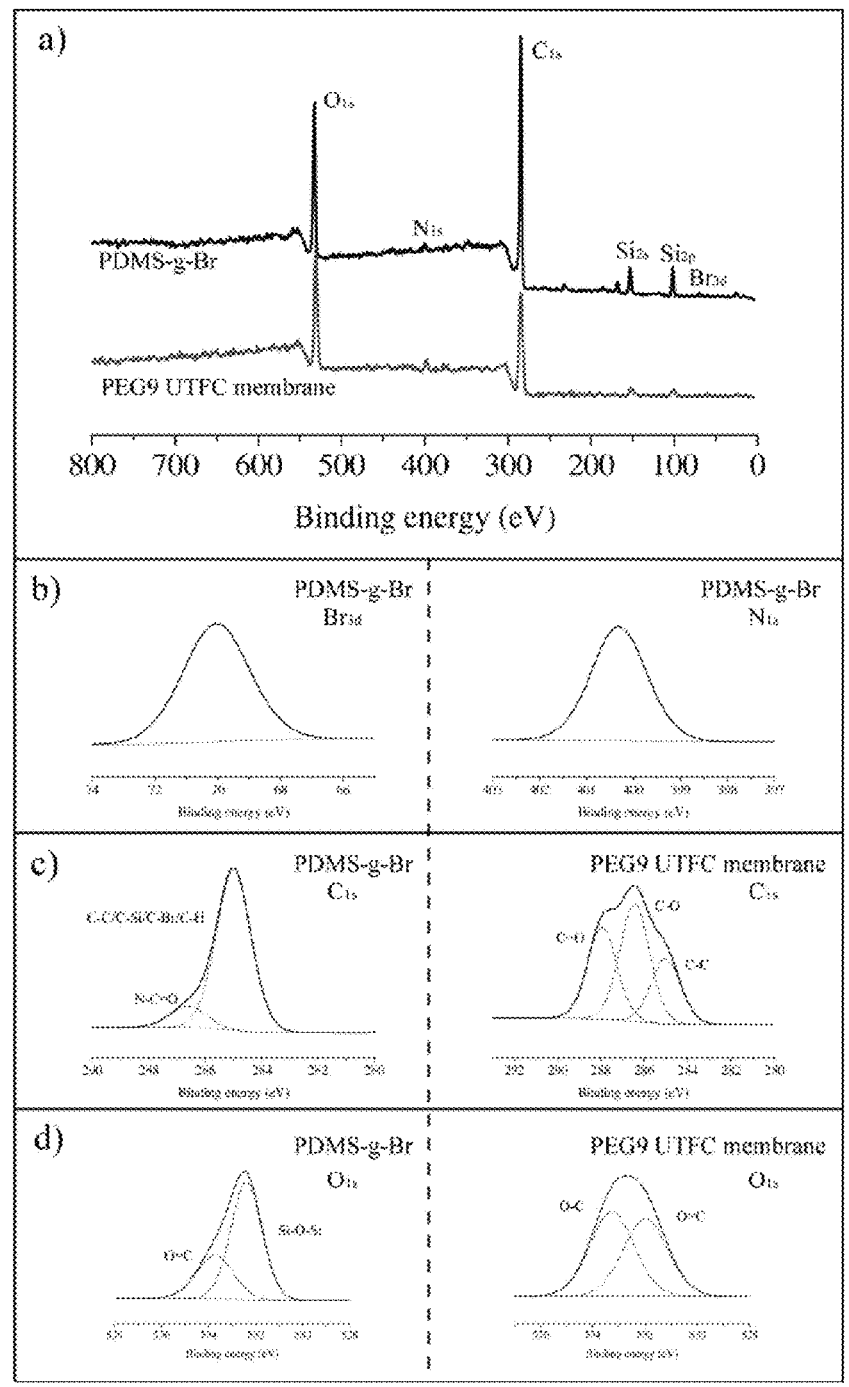
FIG. 7 illustrates (a) XPS wide scan spectra of the PDMS-g-Br coated on PAN substrate and PEG9 ultra thin film composite membrane; (b) high-resolution XPS Br3d and N1s spectra of PDMS-g-Br; (c) high-resolution XPS C1s spectra of PDMS-g-Br and PEG9 UTFC membrane; (d) high-resolution XPS O1s spectra of PDMS-g-Br and PEG9 UTFC membrane prepared in Example 4.
Figure 8:
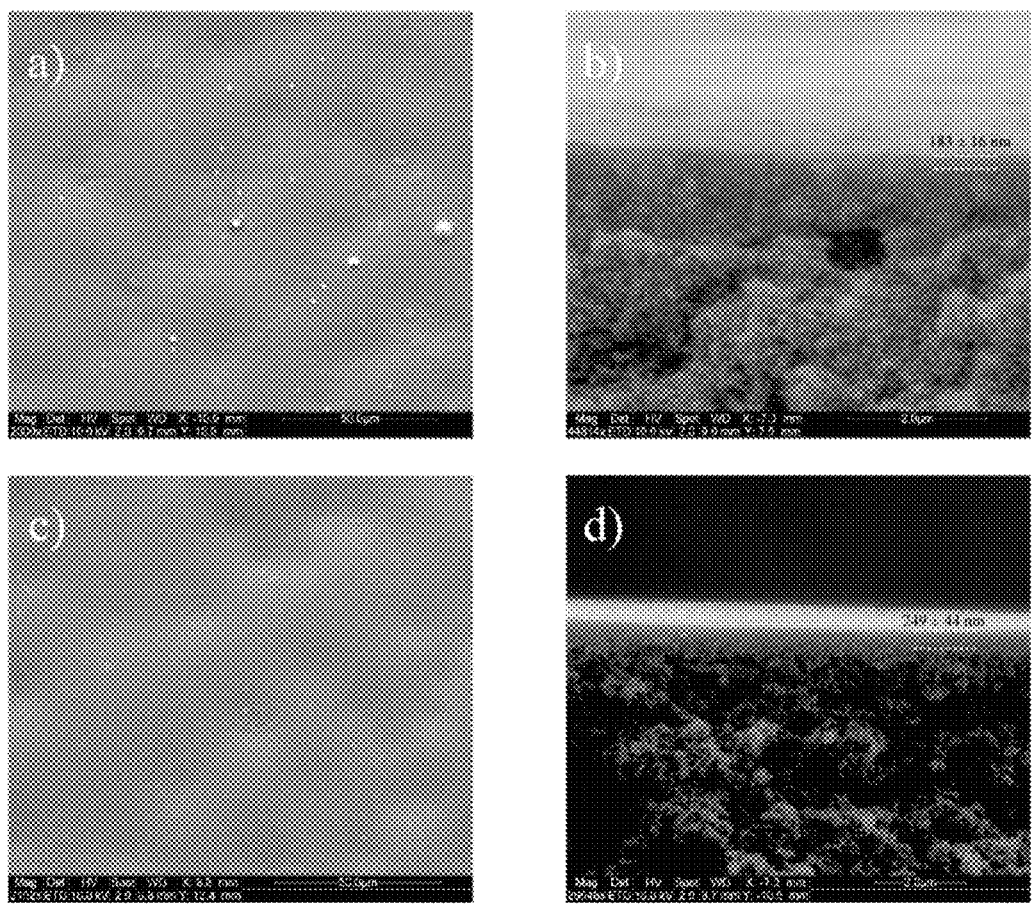
FIG. 8 illustrates SEM images of top view and cross-section view of the PDMS-g-Br coated on PAN substrate (a and b) and PEG9 UTFC membrane (c and d) prepared in Example 4.
Figure 9:
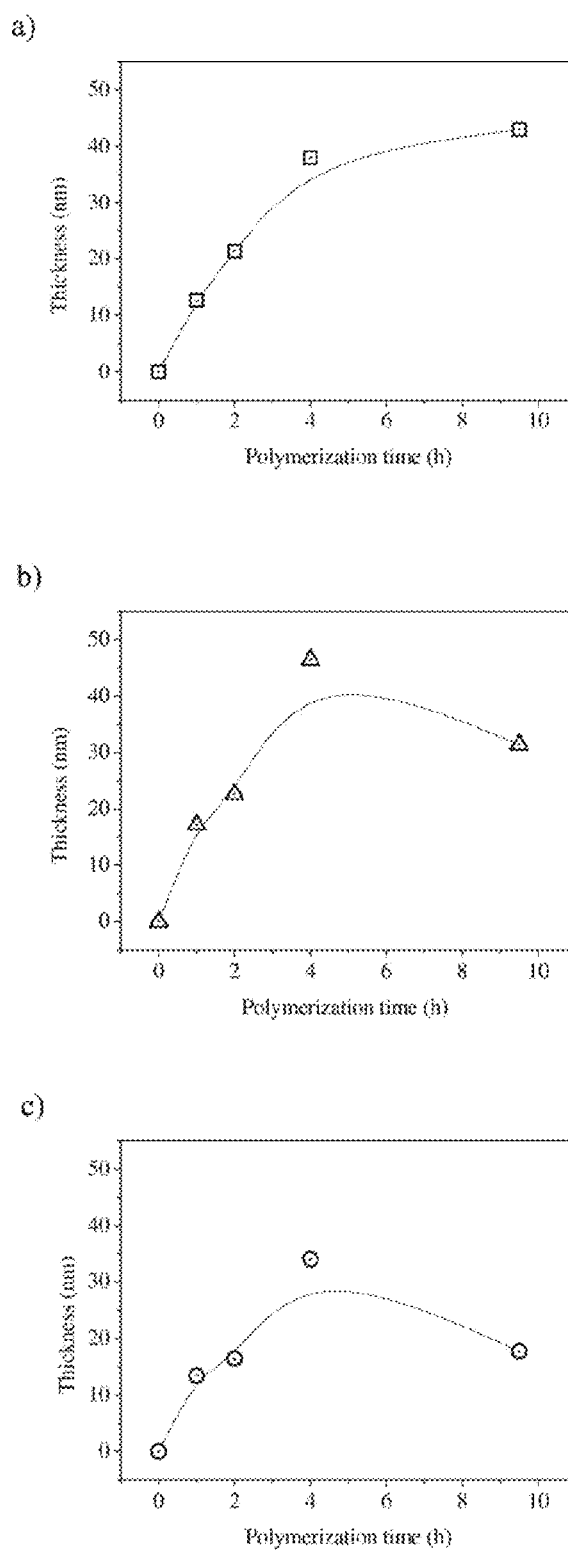
FIG. 9 illustrates thickness growth profile of a) PEG4, b) PEG9 and c) PEG13 ultra-thin films prepared in Example 4 as a function of the polymerization time on silicon wafer (obtained by AFM)
Figure 10:
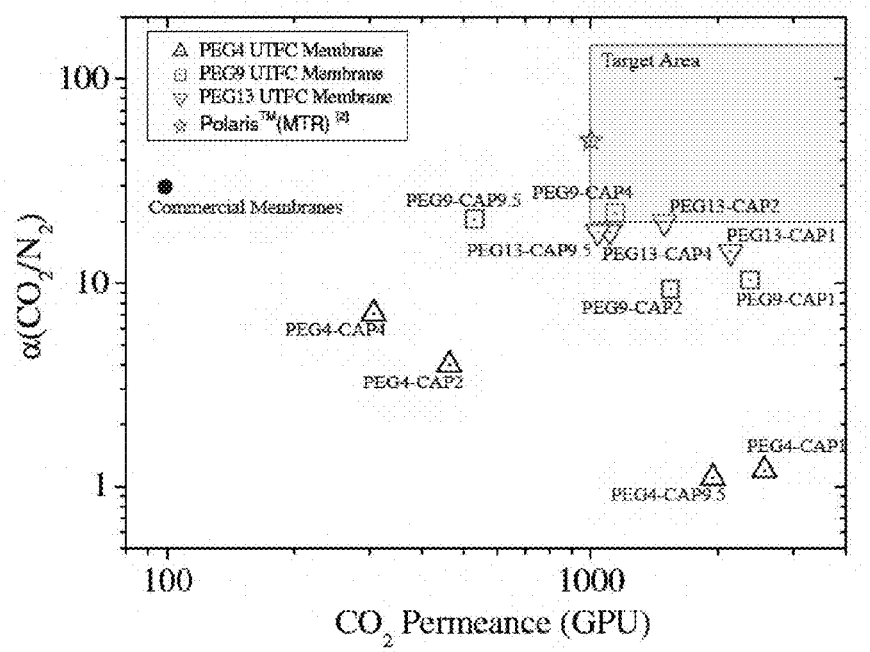
FIG. 10 illustrates relationship between $CO_2$ permeance and $CO_2/N_2$ selectivity across the different molecular weight PEGDMA CAP UTFC membranes prepared in Example 4.
Figure 11:
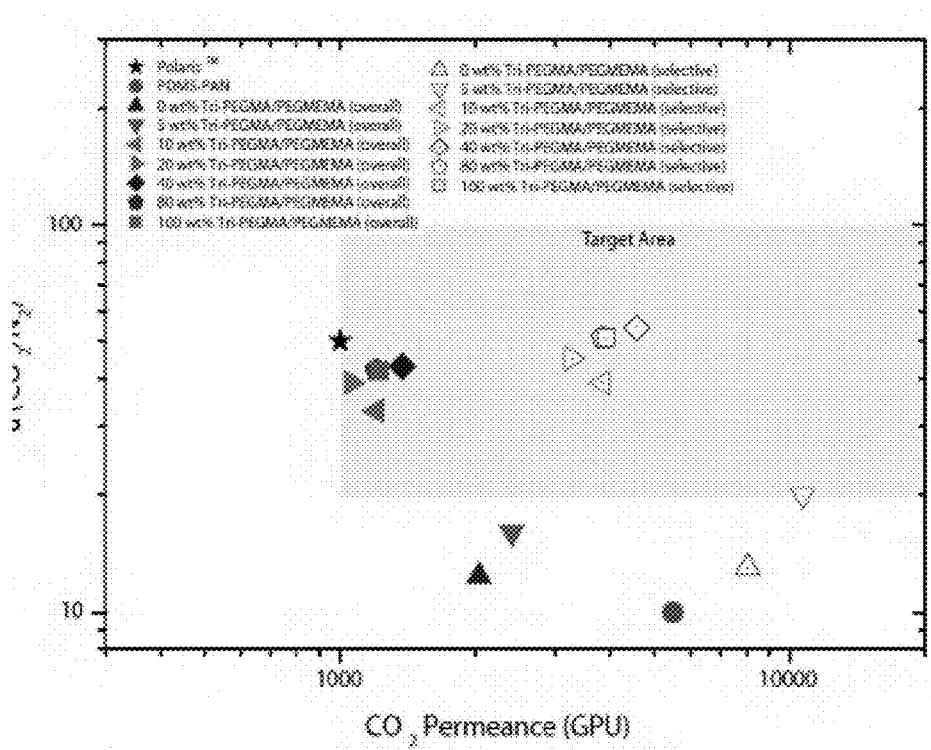
FIG. 11 illustrates $CO_2/N_2$ separation performance of Tri-PEGMA/PEGMEMA CAP membranes and their selective layers prepared in Example 5 on a plot of $CO_2$ permeance verse $CO_2/N_2$ selectivity.
Figure 12:
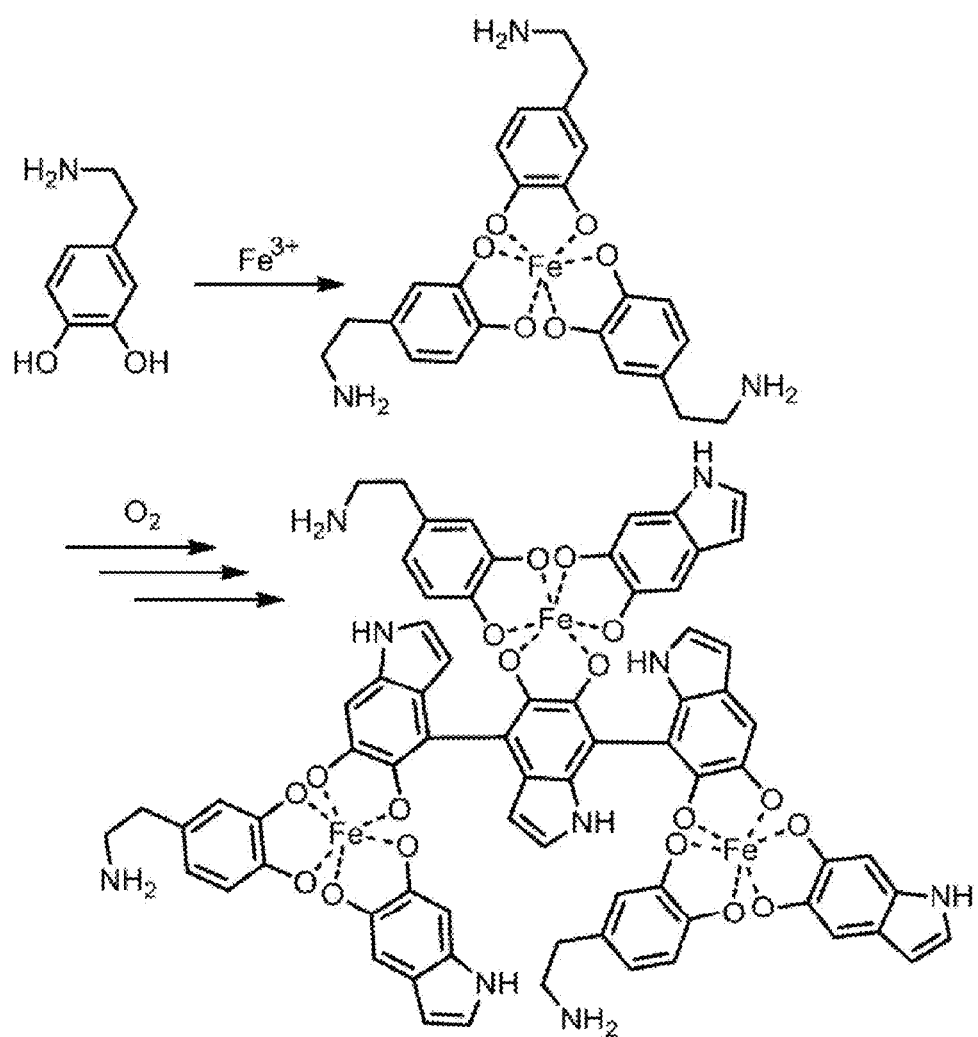
FIG. 12 illustrates preparation of Fe-dopamin ($FeDA_x$) inorganic-organic hybrid nanoparticles.
Figure 13:
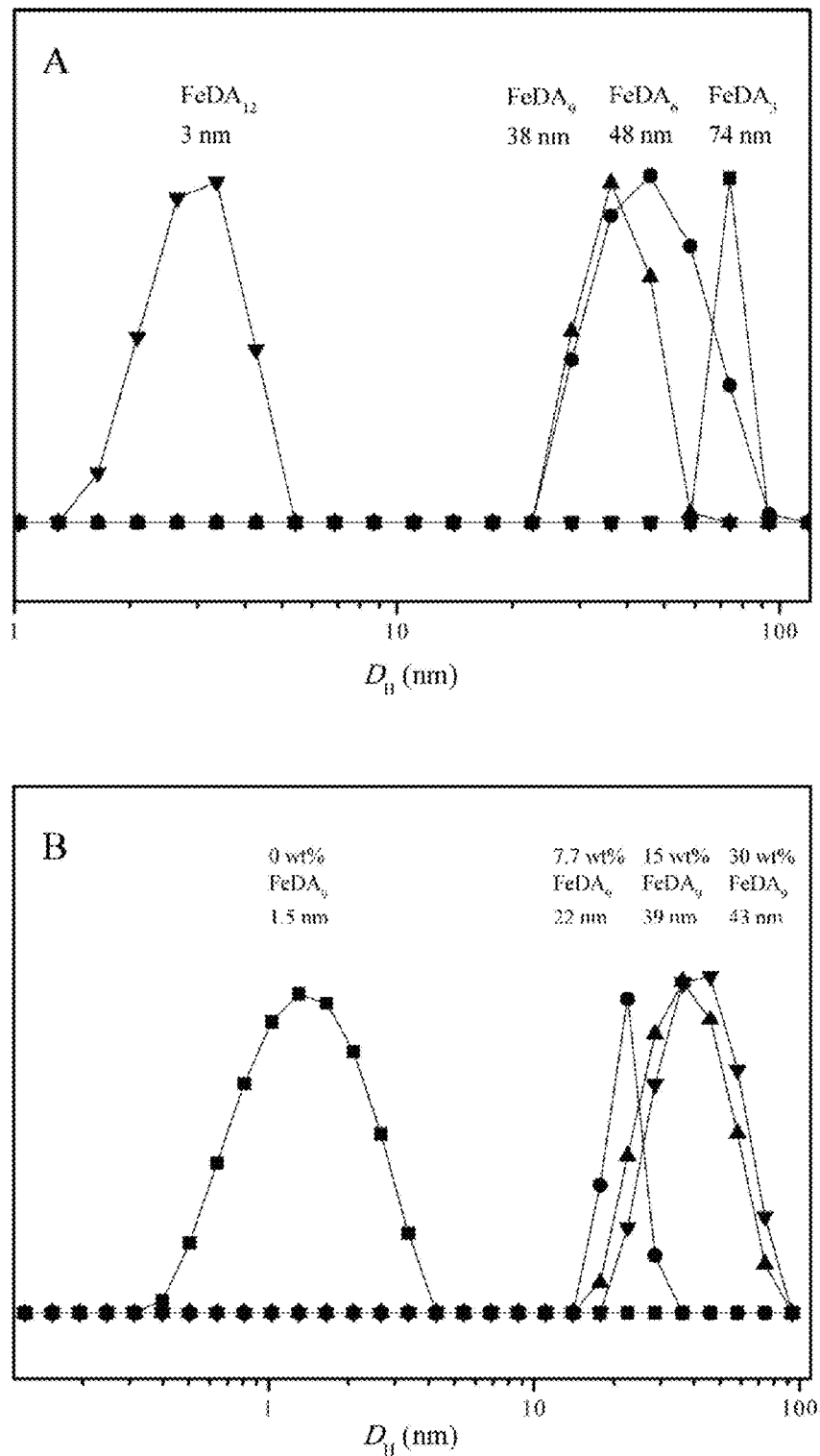
FIG. 13 illustrates a variety of FeDA NPs hydrodynamic diameter distribution curves with (A) different $Fe^{3+}/DA$ molar ratios and (B) different contents of FeDA NPs in the CAP reaction solutions, prepared in Example and determined by DLS measurements.
Figure 14:
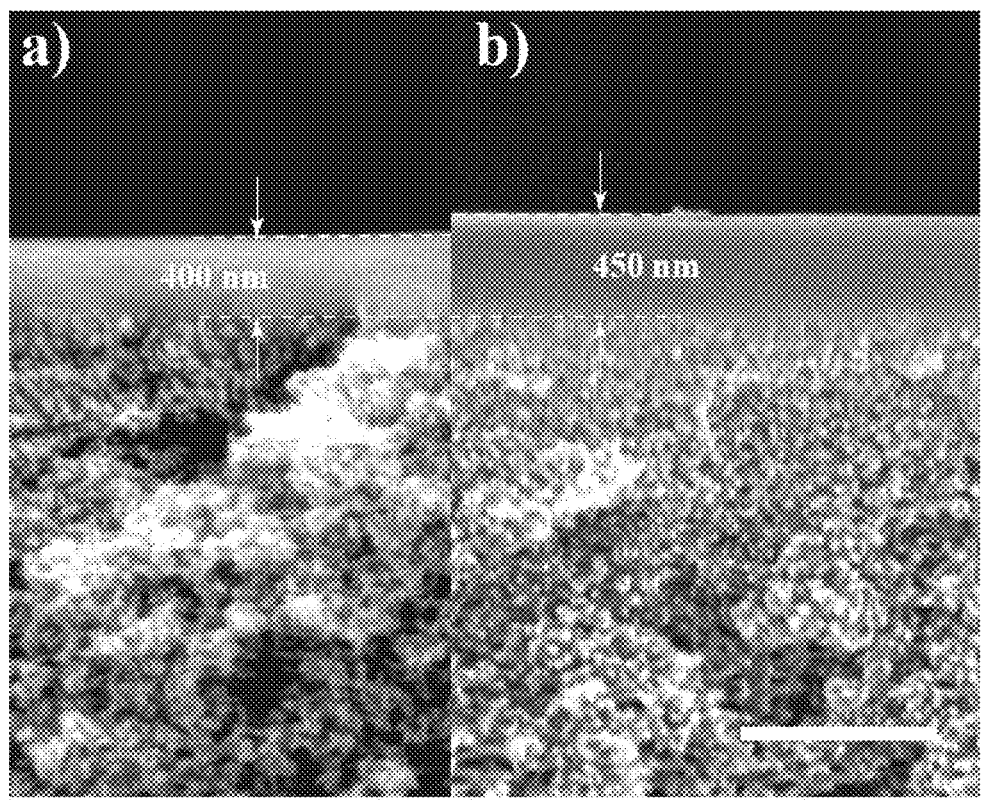
FIG. 14 illustrates SEM images of cross-section view of (a) the PDMS-g-Br coated on PAN substrate and (b) $FeDA_3NPs$/PEGDMA UTFC membrane prepared in Example 6.
Figure 15:
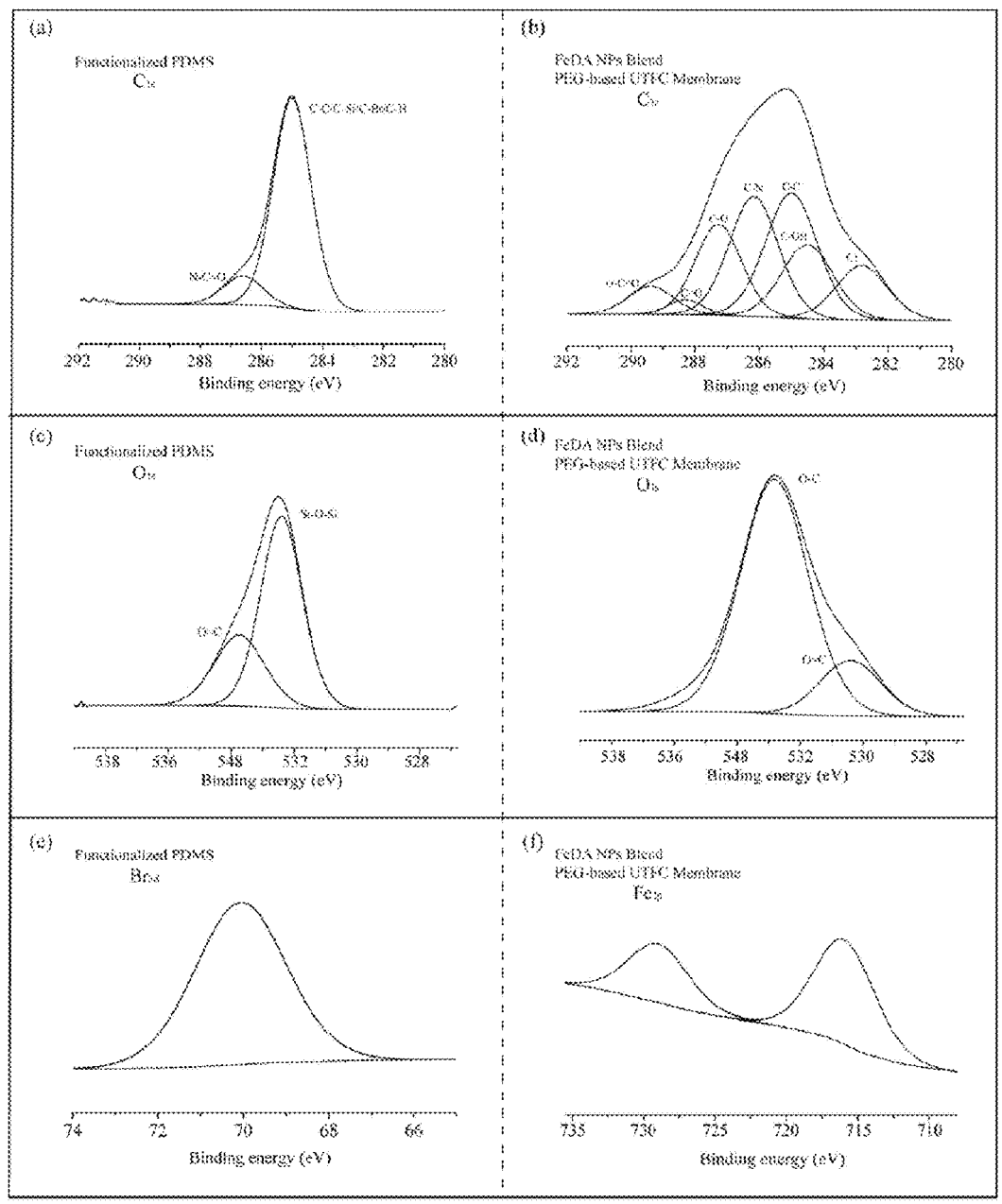
FIG. 15 illustrates high-resolution XPS (a) C1s, (c) O1s and (e) Br3d spectra of PDMS-g-Br; (b) C1s, (d) O1s and (f) Fe2p spectra of $FeDA_9$ NPs/PEGDMA UTFC membrane prepared in Example 6.
Figure 16:
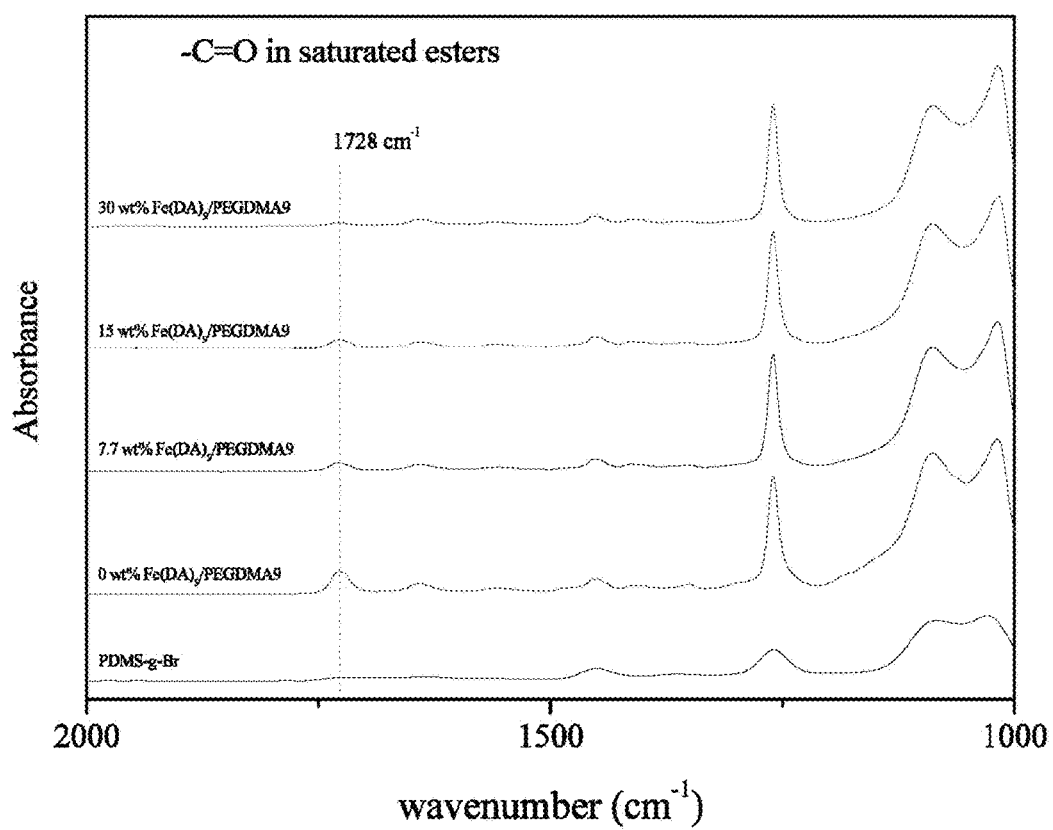
FIG. 16 illustrates FTIR spectra of PDMS cross-linked prelayer and FeDA$_9$ NPs/PEGDMA UTFC membranes prepared in Example 6.
Figure 17:
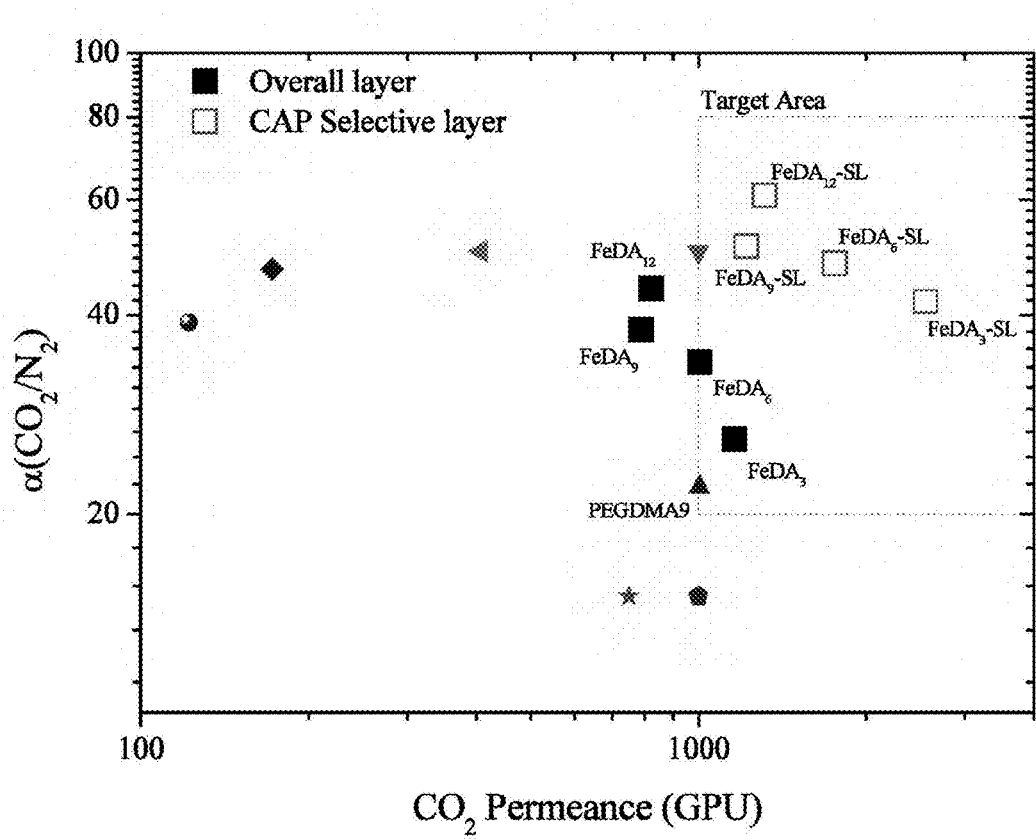
FIG. 17 illustrates best $CO_2/N_2$ separation performance of Fe(DA)$_x$ NPs/PEGDMA CAP membranes and their selective layers prepared in Example on a plot of $CO_2$ permeance verse $CO_2/N_2$ selectivity.

To assist with further describing the method of preparing a gas separation membrane in accordance with the invention, reference is made to FIG. 2, where step (I) involves forming a sealing polymer layer on the second surface region of a porous substrate. In that case, a PAN porous substrate is used and the sealing polymer layer formed on the porous substrate is prepared in two steps. The first step involves forming a crosslinked polydimethyl siloxane (PDMS) layer using amine terminated PDMS and TMC. The second step (II) then involves spin coating a PDMS having a plurality of living polymerisation moieties covalently bound thereto (P2) onto the previously formed PDMS sealing layer (i.e. the "gutter layer" shown in FIG. 2).

Step (II) provides for a porous substrate having (a) a first and second surface region between which the mixture of gas species will flow, and (b) a sealing polymer layer that forms a continuous coating across the second surface region and is permeable to the mixture of gas species. The sealing polymer layer is of different composition to the porous substrate and presents at its outermost surface a plurality of living polymerisation moieties that are covalently bound to polymer chains that form part of the sealing polymer layer.

In step (III) a selective polymer layer, in the form of crosslinked macromolecular film, is then formed on the outermost surface of the sealing polymer layer by polymerising, under the control of the living polymerisation moieties, macromolecules (P3) having a plurality of polymerisable functional groups. The resulting product of step (III) is an ultra-thin film composite membrane in accordance with the present invention.

The gas separation membrane in accordance with the invention may comprise two or more sealing polymer layers and/or two or more selective polymer layers. For example, in one embodiment, the gas separation membrane comprises a second selective polymer layer that is different from and located on the surface of the first mentioned selective polymer layer. In that case, the second selective polymer layer may also be in the form of a crosslinked macromolecular film as described herein. Alternatively, the gas separation membrane may comprise a second sealing polymer layer that forms a continuous coating across the selective polymer layer. A second selective polymer layer may then be located on and covalently coupled to the second sealing polymer layer.

The nature of such further sealing and selective polymer layers may be as the sealing and selective polymer layers herein described.

The present invention also provides a process for separating a target gas species from a mixture of gas species. The nature of the mixture of gas species and target gas species is as herein described.

The gas separation process comprises contacting the mixture of gas species to be separated with a gas separation membrane according to the invention.

A key component of the gas separation membrane for promoting separation of the target gas species is of course the selectivity of polymer layer. The porous substrate and sealing polymer layer collectively provide for mechanical strength of the membrane and a surface upon which the selective polymer layer may be effectively and efficiently formed.

Provided there is transport of the target gas species through the selective polymer layer there is no particular limitation concerning which side (i.e. the porous substrate side or the selective polymer layer side) of the membrane is exposed to the mixture of gas species to be separated. Generally, the selective polymer layer side of membrane will be exposed to the mixture of gas species to be separated.

In one embodiment, the mixture of gas species to be separated enters the gas separation membrane from the first surface region of the porous substrate and the separated gas composition having a higher concentration of the target gas species, relative to the mixture of gas species subjected to separation, exits through the selective polymer layer.

In an alternative preferred embodiment, the mixture of gas species to be separated makes contact with the selective polymer layer and the separated gas composition having a higher concentration of the target gas species, relative to the mixture of gas species subjected to separation, permeates through the selective polymer layer and exits through the first surface region of the porous substrate. In that case, the second surface region of the porous substrate may be described as a gas entry surface region and the first surface region described as a gas exit surface region. In other words gas will flow from the second surface region of the substrate in the direction of the first surface region.

According to the gas separation process, a difference in pressure is created across the gas separation membrane to facilitate transport of the target gas species through the selective polymer layer to provide for the separated gas composition. Techniques for creating such a differential pressure across the gas separation membrane are well known to those skilled in the art. For example, the opposing sides of the membrane may be isolated from each other (in terms of gas flow) and the mixture of gas species to be separated applied under pressure to one side of the membrane.

The separated gas composition produced in accordance with the process has a higher concentration of target gas species in it relative to the concentration of that gas species in the mixture of gas species that was subject to separation. As the efficiency of the gas separation membrane increases so too will the concentration of the target gas species in the separated gas composition.

Generally, the concentration of the target gas species will be at least 1.5, 2, 2.5, 3, 3.5, 4, 4.5, or 5 times higher in the separated gas composition compared with that in the mixture of gas species that was subjected to separation.

In one embodiment, the process involves separating $CO_2$ from a mixture of gas species comprising $CO_2$ and one or more of $N_2$, $H_2$, $CH_4$, $O_2$, $H_2O$, $H_2S$, $SO_x$, $NO_x$, HCl and He.

In another embodiment, the process involves separating $CO_2$ from $N_2$, and/or separating $CO_2$ from $CH_4$.

In a further embodiment, the process provides for a $CO_2$ permeance of at least 1000 GPU, or at least 3000 GPU, or at least 5000 GPU, and/or a selectivity of more than 7, or more than 10 for $CO_2/N_2$, and/or a selectivity of more than 3, or more than 5 for $CO_2/CH_4$.

As used herein, the term "alkyl", used either alone or in compound words denotes straight chain, branched or cyclic alkyl, preferably $C_{1-20}$ alkyl, e.g. $C_{1-10}$ or $C_{1-6}$. Examples of straight chain and branched alkyl include methyl, ethyl, n-propyl, isopropyl, n-butyl, sec-butyl, t-butyl, n-pentyl, 1,2-dimethylpropyl, 1,1-dimethyl-propyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3- , 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like. Where an alkyl group is referred to generally as "propyl", butyl" etc, it will be understood that this can refer to any of straight, branched and cyclic isomers where appropriate. An alkyl group may be optionally substituted by one or more optional substituents as herein defined.

The term "alkenyl" as used herein denotes groups formed from straight chain, branched or cyclic hydrocarbon residues containing at least one carbon to carbon double bond including ethylenically mono-, di- or polyunsaturated alkyl or cycloalkyl groups as previously defined, preferably $C_{2-20}$ alkenyl (e.g. $C_{2-10}$ or $C_{2-6}$). Examples of alkenyl include vinyl, allyl, 1-methylvinyl, butenyl, iso-butenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1,4-pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl. An alkenyl group may be optionally substituted by one or more optional substituents as herein defined.

As used herein the term "alkynyl" denotes groups formed from straight chain, branched or cyclic hydrocarbon residues containing at least one carbon-carbon triple bond including ethylenically mono-, di- or polyunsaturated alkyl or cycloalkyl groups as previously defined. Unless the number of carbon atoms is specified the term preferably refers to $C_{2-20}$ alkynyl (e.g. $C_{2-10}$ or $C_{2-6}$). Examples include ethynyl, 1-propynyl, 2-propynyl, and butynyl isomers, and pentynyl isomers. An alkynyl group may be optionally substituted by one or more optional substituents as herein defined.

The term "halogen" ("halo") denotes fluorine, chlorine, bromine or iodine (fluoro, chloro, bromo or iodo).

The term "aryl" (or "carboaryl") denotes any of single, polynuclear, conjugated and fused residues of aromatic hydrocarbon ring systems (e.g. $C_{6-24}$ or $C_{6-18}$). Examples of aryl include phenyl, biphenyl, terphenyl, quaterphenyl, naphthyl, tetrahydronaphthyl, anthracenyl, dihydroanthracenyl, benzanthracenyl, dibenzanthracenyl, phenanthrenyl, fluorenyl, pyrenyl, idenyl, azulenyl, chrysenyl. Preferred aryl include phenyl and naphthyl. An aryl group may or may not be optionally substituted by one or more optional substituents as herein defined. The term "arylene" is intended to denote the divalent form of aryl.

The term "carbocyclyl" includes any of non-aromatic monocyclic, polycyclic, fused or conjugated hydrocarbon residues, preferably $C_{3-20}$ (e.g. $C_{3-10}$ or $C_{3-8}$). The rings may be saturated, e.g. cycloalkyl, or may possess one or more double bonds (cycloalkenyl) and/or one or more triple bonds (cycloalkynyl). Particularly preferred carbocyclyl moieties are 5-6-membered or 9-10 membered ring systems. Suitable examples include cyclopropyl, cyclobutyl, cyclopentyl, cyclohexyl, cycloheptyl, cyclooctyl, cyclononyl, cyclodecyl, cyclopentenyl, cyclohexenyl, cyclooctenyl, cyclopentadienyl, cyclohexadienyl, cyclooctatetraenyl, indanyl, decalinyl and indenyl. A carbocyclyl group may be optionally substituted by one or more optional substituents as herein defined. The term "carbocyclylene" is intended to denote the divalent form of carbocyclyl.

The term "heteroatom" or "hetero" as used herein in its broadest sense refers to any atom other than a carbon atom which may be a member of a cyclic organic group. Particular examples of heteroatoms include nitrogen, oxygen, sulfur, phosphorous, boron, silicon, selenium and tellurium, more particularly nitrogen, oxygen and sulfur.

The term "heterocyclyl" when used alone or in compound words includes any of monocyclic, polycyclic, fused or conjugated hydrocarbon residues, preferably $C_{3-20}$ (e.g. $C_{3-10}$ or $C_{3-8}$) wherein one or more carbon atoms are replaced by a heteroatom so as to provide a non-aromatic residue. Suitable heteroatoms include O, N, S, P and Se, particularly O, N and S. Where two or more carbon atoms are replaced, this may be by two or more of the same heteroatom or by different heteroatoms. The heterocyclyl group may be saturated or partially unsaturated, i.e. possess one or more double bonds. Particularly preferred heterocyclyl are 5-6 and 9-10 membered heterocyclyl. Suitable examples of heterocyclyl groups may include azridinyl, oxiranyl, thiiranyl, azetidinyl, oxetanyl, thietanyl, 2H-pyrrolyl, pyrrolidinyl, pyrrolinyl, piperidyl, piperazinyl, morpholinyl, indolinyl, imidazolidinyl, imidazolinyl, pyrazolidinyl, thiomorpholinyl, dioxanyl, tetrahydrofuranyl, tetrahydropyranyl, tetrahydropyrrolyl, tetrahydrothiophenyl, pyrazolinyl, dioxalanyl, thiazolidinyl, isoxazolidinyl, dihydropyranyl, oxazinyl, thiepinyl, thiomorpholinyl, oxathianyl, dithianyl, trioxanyl, thiadiazinyl, dithiazinyl, trithianyl, azepinyl, oxepinyl, thiepinyl, indenyl, indanyl, 3H-indolyl, isoindolinyl, 4H-quinolazinyl, chromenyl, chromanyl, isochromanyl, pyranyl and dihydropyranyl. A heterocyclyl group may be optionally substituted by one or more optional substituents as herein defined. The term "heterocyclylene" is intended to denote the divalent form of heterocyclyl.

The term "heteroaryl" includes any of monocyclic, polycyclic, fused or conjugated hydrocarbon residues, wherein one or more carbon atoms are replaced by a heteroatom so as to provide an aromatic residue. Preferred heteroaryl have 3-20 ring atoms, e.g. 3-10. Particularly preferred heteroaryl are 5-6 and 9-10 membered bicyclic ring systems.

Suitable heteroatoms include, O, N, S, P and Se, particularly O, N and S. Where two or more carbon atoms are replaced, this may be by two or more of the same heteroatom or by different heteroatoms. Suitable examples of heteroaryl groups may include pyridyl, pyrrolyl, thienyl, imidazolyl, furanyl, benzothienyl, isobenzothienyl, benzofuranyl, isobenzofuranyl, indolyl, isoindolyl, pyrazolyl, pyrazinyl, pyrimidinyl, pyridazinyl, indolizinyl, quinolyl, isoquinolyl, phthalazinyl, 1,5-naphthyridinyl, quinozalinyl, quinazolinyl, quinolinyl, oxazolyl, thiazolyl, isothiazolyl, isoxazolyl, triazolyl, oxadialzolyl, oxatriazolyl, triazinyl, and furazanyl. A heteroaryl group may be optionally substituted by one or more optional substituents as herein defined. The term "heteroarylene" is intended to denote the divalent form of heteroaryl.

The term "acyl" either alone or in compound words denotes a group containing the moiety C=O (and not being a carboxylic acid, ester or amide) Preferred acyl includes C(O)—$R^e$, wherein $R^e$ is hydrogen or an alkyl, alkenyl, alkynyl, aryl, heteroaryl, carbocyclyl, or heterocyclyl residue. Examples of acyl include formyl, straight chain or branched alkanoyl (e.g. $C_{1-20}$) such as acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; cycloalkylcarbonyl such as cyclopropylcarbonyl cyclobutylcarbonyl, cyclopentylcarbonyl and cyclohexylcarbonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl]; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aryloxyalkanoyl such as phenoxyacetyl and phenoxypropionyl; arylthiocarbamoyl such as phenylthiocarbamoyl; arylglyoxyloyl such as phenylglyoxyloyl and naphthylglyoxyloyl; arylsulfonyl such as phenylsulfonyl and napthylsulfonyl; heterocicccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolyglyoxyloyl and thienylglyoxyloyl. The $R^e$ residue may be optionally substituted as described herein.

The term "sulfoxide", either alone or in a compound word, refers to a group —S(O)$R^f$ wherein $R^f$ is selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl.

The term "sulfonyl", either alone or in a compound word, refers to a group $S(O)_2$—$R^f$, wherein $R^f$ is selected from hydrogen, alkyl, alkenyl, alkynyl, aryl, heteroaryl, heterocyclyl, carbocyclyl and aralkyl. Examples of preferred $R^f$ include $C_{1-20}$alkyl, phenyl and benzyl.

The term "sulfonamide", either alone or in a compound word, refers to a group S(O)NR$^f$R$^f$ wherein each $R^f$ is independently selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl. In a preferred embodiment at least one $R^f$ is hydrogen. In another form, both $R^f$ are hydrogen.

The term, "amino" is used here in its broadest sense as understood in the art and includes groups of the formula NR$^a$R$^b$ wherein $R^a$ and $R^b$ may be any independently selected from hydrogen, alkyl, alkenyl, alkynyl, aryl, carbocyclyl, heterocyclyl, arylalkyl, and acyl. $R^a$ and $R^b$, together with the nitrogen to which they are attached, may also form a monocyclic, or polycyclic ring system e.g. a 3-10 membered ring, particularly, 5-6 and 9-10 membered systems. Examples of "amino" include NH$_2$, NHalkyl (e.g. $C_{1-20}$alkyl), NHaryl (e.g. NHphenyl), NHaralkyl (e.g. NHbenzyl), NHacyl (e.g. NHC(O )$C_{1-20}$alkyl, NHC(O)phenyl), Nalkylalkyl (wherein each alkyl, for example $C_{1-20}$, may be the same or different) and 5 or 6 membered rings, optionally containing one or more same or different heteroatoms (e.g. O, N and S).

The term "amido" is used here in its broadest sense as understood in the art and includes groups having the formula C(O)NR$^a$R$^b$, wherein $R^a$ and $R^b$ are as defined as above. Examples of amido include C(O)NH$_2$, C(O)NHalkyl (e.g. $C_{1-20}$alkyl), C(O)NHaryl (e.g. C(O)NHphenyl), C(O) NHaralkyl (e.g. C(O)NHbenzyl), C(O)NHacyl (e.g. C(O) NHC(O)$C_{1-20}$alkyl, C(O)NHC(O)phenyl), C(O)Nalkylalkyl (wherein each alkyl, for example $C_{1-20}$, may be the same or different) and 5 or 6 membered rings, optionally containing one or more same or different heteroatoms (e.g. O, N and S).

The term "carboxy ester" is used here in its broadest sense as understood in the art and includes groups having the formula CO$_2$R$^g$, wherein $R^g$ may be selected from groups including alkyl, alkenyl, alkynyl, aryl, carbocyclyl, heteroaryl, heterocyclyl, aralkyl, and acyl. Examples of carboxy ester include CO$_2$C$_{1-20}$alkyl, CO$_2$aryl (e.g., CO$_2$phenyl), CO$_2$aralkyl (e.g. CO$_2$ benzyl).

As used herein, the term "aryloxy" refers to an "aryl" group attached through an oxygen bridge. Examples of aryloxy substituents include phenoxy, biphenyloxy, naphthyloxy and the like.

As used herein, the term "acyloxy" refers to an "acyl" group wherein the "acyl" group is in turn attached through an oxygen atom. Examples of "acyloxy" include hexylcarbonyloxy (heptanoyloxy), cyclopentylcarbonyloxy, benzoyloxy, 4-chlorobenzoyloxy, decylcarbonyloxy (undecanoyloxy), propylcarbonyloxy (butanoyloxy), octylcarbonyloxy (nonanoyloxy), biphenylcarbonyloxy (eg 4-phenylbenzoyloxy), naphthylcarbonyloxy (eg 1-naphthoyloxy) and the like.

As used herein, the term "alkyloxycarbonyl" refers to a "alkyloxy" group attached through a carbonyl group. Examples of "alkyloxycarbonyl" groups include butylformate, sec-butylformate, hexylformate, octylformate, decylformate, cyclopentylformate and the like.

As used herein, the term "arylalkyl" refers to groups formed from straight or branched chain alkanes substituted with an aromatic ring. Examples of arylalkyl include phenylmethyl (benzyl), phenylethyl and phenylpropyl.

As used herein, the term "alkylaryl" refers to groups formed from aryl groups substituted with a straight chain or branched alkane. Examples of alkylaryl include methylphenyl and isopropylphenyl.

In this specification "optionally substituted" is taken to mean that a group may or may not be substituted or fused (so as to form a condensed polycyclic group) with one, two, three or more of organic and inorganic groups, including those selected from: alkyl, alkenyl, alkynyl, carbocyclyl, aryl, heterocyclyl, heteroaryl, acyl, aralkyl, alkaryl, alkheterocyclyl, alkheteroaryl, alkcarbocyclyl, halo, haloalkyl, haloalkenyl, haloalkynyl, haloaryl, halocarbocyclyl, haloheterocyclyl, haloheteroaryl, haloacyl, haloaryalkyl, hydroxy, hydroxyalkyl, hydroxyalkenyl, hydroxyalkynyl, hydroxycarbocyclyl, hydroxyaryl, hydroxyheterocyclyl, hydroxyheteroaryl, hydroxyacyl, hydroxyaralkyl, alkoxyalkyl, alkoxyalkenyl, alkoxyalkynyl, alkoxycarbocyclyl, alkoxyaryl, alkoxyheterocyclyl, alkoxyheteroaryl, alkoxyacyl, alkoxyaralkyl, alkoxy, alkenyloxy, alkynyloxy, aryloxy, carbocyclyloxy, aralkyloxy, heteroaryloxy, heterocyclyloxy, acyloxy, haloalkoxy, haloalkenyloxy, haloalkynyloxy, haloaryloxy, halocarbocyclyloxy, haloaralkyloxy, haloheteroaryloxy, haloheterocyclyloxy, haloacyloxy, nitro, nitroalkyl, nitroalkenyl, nitroalkynyl, nitroaryl, nitroheterocyclyl, nitroheteroaryl, nitrocarbocyclyl, nitroacyl, nitroaralkyl, amino (NH$_2$), alkylamino, dialkylamino, alkenylamino, alkynylamino, arylamino, diarylamino, aralkylamino, diaralkylamino, acylamino, diacylamino, heterocyclamino, heteroarylamino, carboxy, carboxyester, amido, alkylsulphonyloxy, arylsulphenyloxy, alkylsulphenyl, arylsulphenyl, thio, alkylthio, alkenylthio, alkynylthio, arylthio, aralkylthio, carbocyclylthio, heterocyclylthio, heteroarylthio, acylthio, sulfoxide, sulfonyl, sulfonamide, aminoalkyl, aminoalkenyl, aminoalkynyl, aminocarbocyclyl, aminoaryl, aminoheterocyclyl, aminoheteroaryl, aminoacyl, aminoaralkyl, thioalkyl, thioalkenyl, thioalkynyl, thiocarbocyclyl, thioaryl, thioheterocyclyl, thioheteroaryl, thioacyl, thioaralkyl, carboxyalkyl, carboxyalkenyl, carboxyalkynyl, carboxycarbocyclyl, carboxyaryl, carboxyheterocyclyl, carboxyheteroaryl, carboxyacyl, carboxyaralkyl, carboxyesteralkyl, carboxyesteralkenyl, carboxyesteralkynyl, carboxyestercarbocyclyl, carboxyesteraryl, carboxyesterheterocyclyl, carboxyesterheteroaryl, carboxyesteracyl, carboxyesteraralkyl, amidoalkyl, amidoalkenyl, amidoalkynyl, amidocarbocyclyl, amidoaryl, amidoheterocyclyl, amidoheteroaryl, amidoacyl, amidoaralkyl, formylalkyl, formylalkenyl, formylalkynyl, formylcarbocyclyl, formylaryl, formylheterocyclyl, formylheteroaryl, formylacyl, formylaralkyl, acylalkyl, acylalkenyl, acylalkynyl, acylcarbocyclyl, acylaryl, acylheterocyclyl, acylheteroaryl, acylacyl, acylaralkyl, sulfoxidealkyl, sulfoxidealkenyl, sulfoxidealkynyl, sulfoxidecarbocyclyl, sulfoxidearyl, sulfoxideheterocyclyl, sulfoxideheteroaryl, sulfoxideacyl, sulfoxidearalkyl, sulfonylalkyl, sulfonylalkenyl, sulfonylalkynyl, sulfonylcarbocyclyl, sulfonylaryl, sulfonylheterocyclyl, sulfonylheteroaryl, sulfonylacyl, sulfonylaralkyl, sulfonamidoalkyl, sulfonamidoalkenyl, sulfonamidoalkynyl, sulfonamidocarbocyclyl, sulfonamidoaryl, sulfonamidoheterocyclyl, sulfonamidoheteroaryl, sulfonamidoacyl, sulfonamidoaralkyl, nitroalkyl, nitroalkenyl, nitroalkynyl, nitrocarbocyclyl, nitroaryl, nitroheterocyclyl, nitroheteroaryl, nitroacyl, nitroaralkyl, cyano, sulfate, phosphate, triarylmethyl, triarylamino, oxadiazole, and carbazole groups. Optional substitution may also be taken to refer to where a —CH$_2$— group in a chain or ring is replaced by a group selected from —O—, —S—, —NR$^a$—, —C(O)— (i.e. carbonyl), —C(O)O— (i.e. ester), and —C(O)NR$^a$— (i.e. amide), where R$^a$ is as defined herein.

Preferred optional substituents include alkyl, (e.g. C$_{1-6}$ alkyl such as methyl, ethyl, propyl, butyl, cyclopropyl, cyclobutyl, cyclopentyl or cyclohexyl), hydroxyalkyl (e.g. hydroxymethyl, hydroxyethyl, hydroxypropyl), alkoxyalkyl (e.g. methoxymethyl, methoxyethyl, methoxypropyl, ethoxymethyl, ethoxyethyl, ethoxypropyl etc) alkoxy (e.g. C$_{1-6}$ alkoxy such as methoxy, ethoxy, propoxy, butoxy, cyclopropoxy, cyclobutoxy), halo, trifluoromethyl, trichloromethyl, tribromomethyl, hydroxy, phenyl (which itself may be further substituted e.g., by C$_{1-6}$ alkyl, halo, hydroxy, hydroxyC$_{1-6}$ alkyl, C$_{1-6}$ alkoxy, haloC$_{1-6}$alkyl, cyano, nitro OC(O)C$_{1-6}$ alkyl, and amino), benzyl (wherein benzyl itself may be further substituted e.g., by C$_{1-6}$ alkyl, halo, hydroxy, hydroxyC$_{1-6}$alkyl, C$_{1-6}$ alkoxy, haloC$_{1-6}$ alkyl, cyano, nitro OC(O)C$_{1-6}$ alkyl, and amino), phenoxy (wherein phenyl itself may be further substituted e.g. by C$_{1-6}$ alkyl, halo, hydroxy, hydroxyC$_{1-6}$ alkyl, C$_{1-6}$ alkoxy, haloC$_{1-6}$ alkyl, cyano, nitro OC(O)C$_{1-6}$ alkyl, and amino), benzyloxy (wherein benzyl itself may be further substituted e.g., by C$_{1-6}$ alkyl, halo, hydroxy, hydroxyC$_{1-6}$ alkyl, C$_{1-6}$ alkoxy, haloC$_{1-6}$ alkyl, cyano, nitro OC(O)C$_{1-6}$ alkyl, and amino), amino, alkylamino (e.g. C$_{1-6}$ alkyl, such as methylamino, ethylamino, propylamino etc), dialkylamino (e.g. C$_{1-6}$ alkyl, such as dimethylamino, diethylamino, dipropylamino), acylamino (e.g. NHC(O)CH$_3$), phenylamino (wherein phenyl itself may be further substituted e.g., by C$_{1-6}$ alkyl, halo, hydroxy, hydroxyC$_{1-6}$ alkyl, C$_{1-6}$ alkoxy, haloC$_{1-6}$ alkyl, cyano, nitro OC(O)C$_{1-6}$ alkyl, and amino), nitro, formyl, —C(O)-alkyl (e.g. C$_{1-6}$ alkyl, such as acetyl), O—C(O)-alkyl (e.g. C$_{1-6}$alkyl, such as acetyloxy), benzoyl (wherein the phenyl group itself may be further substituted e.g., by C$_{1-6}$ alkyl, halo, hydroxy hydroxyC$_{1-6}$ alkyl, C$_{1-6}$ alkoxy, haloC$_{1-6}$ alkyl, cyano, nitro OC(O)C$_{1-6}$alkyl, and amino), replacement of CH$_2$ with C=O, CO$_2$H, CO$_2$alkyl (e.g. C$_{1-6}$ alkyl such as methyl ester, ethyl ester, propyl ester, butyl ester), CO$_2$phenyl (wherein phenyl itself may be further substituted e.g., by C$_{1-6}$ alkyl, halo, hydroxy, hydroxyl C$_{1-6}$ alkyl, C$_{1-6}$ alkoxy, halo C$_{1-6}$ alkyl, cyano, nitro OC(O)C$_{1-6}$ alkyl, and amino), CONH$_2$, CONHphenyl (wherein phenyl itself may be further substituted e.g., by C$_{1-6}$ alkyl, halo, hydroxy, hydroxyl C$_{1-6}$ alkyl, C$_{1-6}$ alkoxy, halo C$_{1-6}$ alkyl, cyano, nitro OC(O)C$_{1-6}$ alkyl, and amino), CONHbenzyl (wherein benzyl itself may be further substituted e.g., by C$_{1-6}$ alkyl, halo, hydroxy hydroxyl C$_{1-6}$ alkyl, C$_{1-6}$ alkoxy, halo C$_{1-6}$ alkyl, cyano, nitro OC(O)C$_{1-6}$ alkyl, and amino), CONHalkyl (e.g. C$_{1-6}$ alkyl such as methyl ester, ethyl ester, propyl ester, butyl amide) CONHdialkyl (e.g. C$_{1-6}$ alkyl) aminoalkyl (e.g., HN C$_{1-6}$ alkyl-, C$_{1-6}$alkylHN-C$_{1-6}$ alkyl- and (C$_{1-6}$ alkyl)$_2$N—C$_{1-6}$ alkyl-), thioalkyl (e.g., HS C$_{1-6}$ alkyl-), carboxyalkyl (e.g., HO$_2$CC$_{1-6}$ alkyl-), carboxyesteralkyl (e.g., C$_{1-6}$ alkylO$_2$CC$_{1-6}$ alkyl-), amidoalkyl (e.g., H$_2$N(O)CC$_{1-6}$ alkyl-, H(C$_{1-6}$ alkyl)N(O)CC$_{1-6}$ alkyl-), formylalkyl (e.g., OHCC$_{1-6}$alkyl-), acylalkyl (e.g., C$_{1-6}$ alkyl(O)CC$_{1-6}$ alkyl-), nitroalkyl (e.g., O$_2$NC$_{1-6}$alkyl-), sulfoxidealkyl (e.g., R(O)SC$_{1-6}$ alkyl, such as C$_{1-6}$ alkyl(O)SC$_{1-6}$ alkyl-), sulfonylalkyl (e.g., R(O)$_2$SC$_{1-6}$ alkyl- such as C$_{1-6}$ alkyl(O)$_2$SC$_{1-6}$ alkyl-), sulfonamidoalkyl (e.g., $_2$HRN(O)SC$_{1-6}$ alkyl, H(C$_{1-6}$ alkyl)N(O)SC$_{1-6}$ alkyl-), triarylmethyl, triarylamino, oxadiazole, and carbazole.

The invention will now be described with reference to the following non-limiting examples.

EXAMPLES

Example 1

Reference

1. Fabricate P(EO-co-GMA) CAP Film on Si Wafer
1.1 Synthesis of Macrocross-Linker poly(ethylene oxide-co-glycidol methacrylate) (P(EO-co-GMA)).

The synthesis of macrocross-linker P(EO-co-GMA) includes three steps: (i) the copolymerization of ethylene oxide (EO) and 2,3-epoxypropyl-1-ethoxyethyl ether protected glycidol (EEGE) to prepare copolymer P(EO-co-EEGE); (ii) hydrolysis of the copolymer to form poly(ethylene oxide-co-glycidol) (P(EO-co-Gly)) and (iii) esterification of poly(EO-co-Gly) with methacryloyl chloride to afford P(EO-co-GMA).

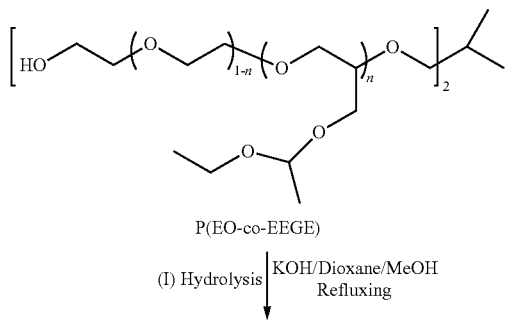

P(EO-co-EEGE)

(I) Hydrolysis | KOH/Dioxane/MeOH Refluxing

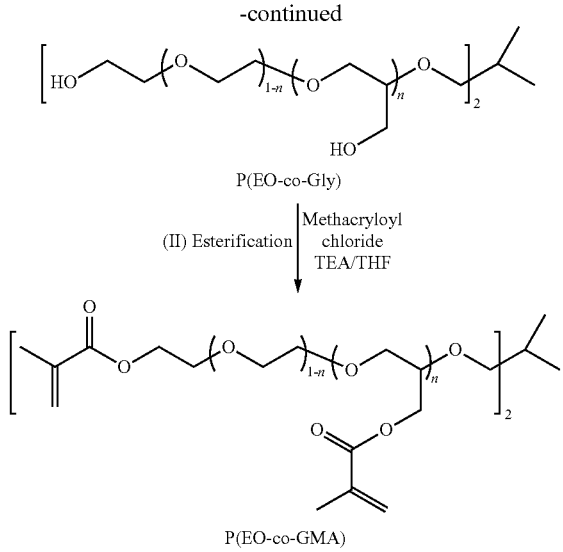

P(EO-co-Gly)

(II) Esterification | Methacryloyl chloride TEA/THF

P(EO-co-GMA)

(i) The synthesis of copolymer P(EO-co-EEGE): The copolymerization of EEGE with EO is carried out according to literature. [EEGE]:[EO]=1:10 (feed ratio in mol.).

(ii) The preparation of copolymer P(EO-co-Gly): The hydrolysis of the EEGE units of the copolymer could occur in two steps. First, 10.0 g of poly(EO-co-EEGE) ($M_n$=22.7 kDa; 0.44 mmol) was mixed with 160 mL of formic acid (0.266 mol), the solution was stirred at 20° C. for 30 min and then poured into methanol, and the precipitate was separated and dried in vacuo at 50° C. Second, the dried product was then dissolved in a mixture of dioxane (100 mL) and MeOH (50 mL), hydrolyzed with a KOH methanol solution (1 M, 27 mL) under refluxing for 24 h, and then neutralized with 5% HCl. After the solvents were removed under reduced pressure, the product was dissolved in 100 mL of DCM. The organic solution was then washed with $H_2O$ (3×50 mL), dried (anhydrous $MgSO_4$), filtered and concentrated in vacuo (1 mbar) at 30° C.

(iii) The preparation of macrocross-linker P(EO-co-GMA): P(EO-co-Gly) (5.0 g, 0.24 mmol; 9.7 mmol of hydroxyl groups) was dissolved in a mixture of 50 mL of anhydrous THF and 4.2 mL of anhydrous TEA (3.05 g, 30 mmol) under bubbling dry nitrogen. Methacryloyl chloride (1.53 g, 14.5 mmol, 1.5 eqv.) was dissolved in 20 mL of anhydrous THF and the solution was added dropwise to PEO solution at 0° C. over 60 min under vigorous stirring. The mixture was then allowed to return to room temperature and stirred for further 24 h. The precipitate of triethylamine hydrochloride (TEA.HCl) was removed by filtration. The solution was concentrated in vacuo (1 mbar) and the product was re-dissolved in 100 mL of DCM. The organic solution was then washed with $H_2O$ (3×50 mL), dried (anhydrous $MgSO_4$), filtered and concentrated in vacuo (1 mbar) at 30° C.

1.2 Modification of Bromo-Initiator Prelayer on Silicon Wafer.

Figure 19:
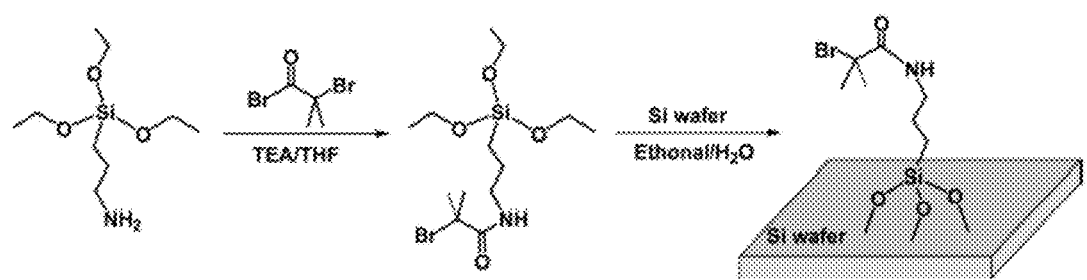
FIG. 19 illustrates a schematic diagram for modifying a bromo-initiator prelayer on a silicon wafer according to Example 1.2.

FIG. 19 illustrates an example schematic diagram for modifying a bromo-initiator prelayer on a silicon wafer. A silicon wafer (ca. 1 cm ×1 cm) was immersed in a vial containing an initiator solution (5% BIBAPTES, 5% Milli Q water, and 90% absolute ethanol) at room temperature overnight. The bromide functionalized silicon wafer was thoroughly washed with ethanol and Milli Q water, and dried in vacuo.

1.3 Assembly of Ultra-Thin CAP Films on Silicon Wafer for a Kinetic Study.

Figure 20:
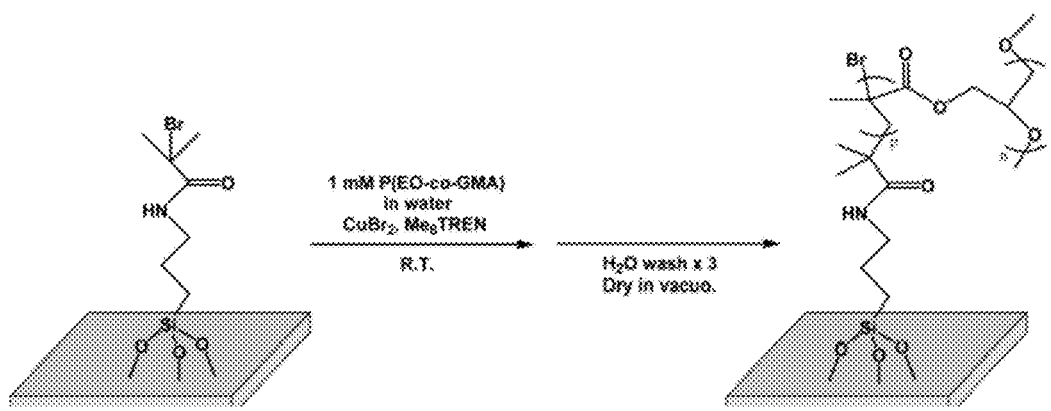
FIG. 20 illustrates a schematic diagram for the assembly of ultra-thin CAP films on a silicon wafer for a kinetic study according to Example 1.3.

FIG. 20 illustrates a schematic diagram for the assembly of ultra-thin CAP films on a silicon wafer for a kinetic study. ATRP was conducted according under 'activator regenerated by electron transfer' (ARGET) conditions in water at ambient temperature. A typical example can be described as follows. All substrate manipulations were conducted in an air-tight container. silicon wafers (ca. 1 cm ×1 cm) functionalised with a bromo-initiator prelayer were added to 10 mL of an aqueous stock solution (pre-filtered through a 0.45 µm filter) containing P(EO-co-GMA) macrocross-linker (2 mM, 40 mM of mathacrylate functionalities), $CuBr_2$ (1 mM), Me6TREN (3 mM) and sodium ascorbate (20 mM). After reaction at room temperature, the polymer-coated wafers were removed (different thickness films were obtained by variation of the exposure time), washed with DI water (3 ×20 mL), soaked in water (20 mL) for 20 min and then dried in vacuo prior to analysis.

Example 2

2. Fabricate P(EO-co-GMA) CAP Film on Porous Substrate
2.1 The Synthesis of Macroinitiator P(DMS-co-BIBAPMS).

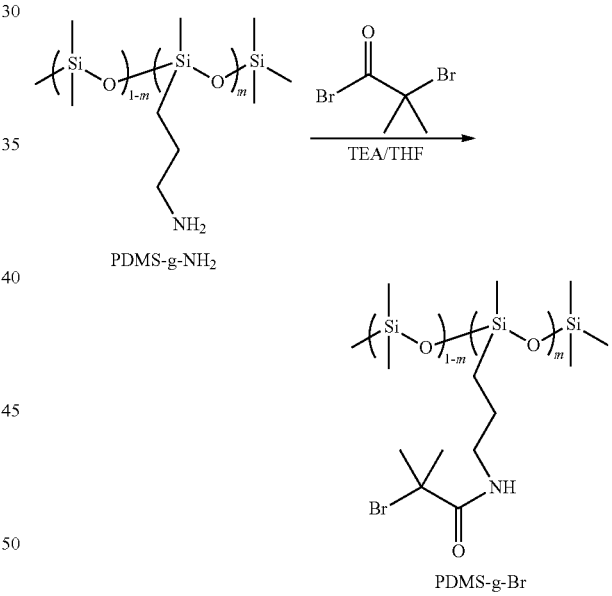

P(DMS-co-APMS) (5.0 g, 1 mmol; 6.3 mmol of aminopropyl groups) and anhydrous TEA (3.9 mL, 28 mmol) were dissolved in 100 mL of anhydrous THF under bubbling dry nitrogen; 1.3 mL of 2-bromoisobutyryl bromide (10.5 mmol, 1.67 equiv) was added dropwise at 0° C. over 30 min under vigorous stirring. The mixture was then warm to room temperature and stirred for further 24 h. The precipitate of triethylamine hydrobromide was removed by filtration. The solution was then concentrated in vacuo (1 mbar) and the product was re-dissolved in 100 mL of DCM. The organic solution was then washed with $H_2O$ (3×50 mL), dried (anhydrous $MgSO_4$), filtered and concentrated in vacuo (1 mbar) at 30° C. Amorphous yellow product, P(DMS-co-BIBAPMS) with a yield of 93% was obtained.

2.2 Fabrication of PDMS Cross-Linked Prelayer.

The cross-linked PDMS prelayer was coated onto PAN substrate as follows. In separate vials, TMC (7 mg, 0.0267 mmol) was dissolved in 0.35 mL of hexane (2.0% w/v) and $NH_2$-PDMS-$NH_2$ (0.2 g, 0.04 mmol, 1 equiv.) was dissolved in 10 mL of hexane (2.0% w/v). The two solutions were mixed for 30 s and 1 mL of the solution was then spin-coated (1 k rpm, 10 s) onto each PAN substrate (19.63 cm²) to prepare the PDMS gutter layer. Then 0.35 mL of TMC solution (1.0% w/v, in hexane) was added to 10 mL of P(DMS-co-BIBAPMS) solution (2.0% w/v, in hexane). 1 mL of the mixture was deposited onto each pre-coating substrate via spin-coat process (1 k rpm, 10 s). Finally, the coated PAN substrates were dried in vacuo (1 mbar) at 25° C. over night and tested for their gas transport properties to ensure that there is no leakage before coating the selective layer.

2.3 Fabrication of Ultra-Thin CAP Films as Selective Layer on PAN Substrate.

The CAP process on PDMS coated PAN substrate was conducted under ARGET-ATRP conditions. The PAN substrates with PDMS initiator layer were immersed in an aqueous solution of P(EO-co-GMA) macrocross-linker (1 mM, 40 mM of mathacrylate functionalities), $CuBr_2$ (1 mM), $Me_6TREN$ (3 mM) and sodium ascorbate (20 mM). After designed reaction time at room temperature, the substrates were taken off, washed with DI water, soaked in water (50 mL) for 20 min and then dried in vacuo at 25° C. for 24 h and tested for their gas transport properties.

2.4 Gas Permeation Measurements.

Single gas measurements of the UTFC membranes were tested by an in-house built apparatus. The schematic diagram of the permeation rig is shown in Figure S2 (Supporting Information). The UTFC membranes were installed in a stainless cell and were tested for single gases ($N_2$ and $CO_2$) at 340 kPa and 35° C. All data presented in this work were collected from at least three UTFC membranes. PAN substrates that were coated with PDMS prelayer were tested for single gases under same condition to detect any leakages. The flow rate of single gases was tested manually with a digital flow meter (Agilent Technologies ADM 2000).

Example 3

Reference

3. Fabricate PEGDMA CAP Film on Si Wafer

3.1 Preparation of Bromide Initiating Layer on Si Wafer.

The procedure for the surface initiation of silicon wafer was referred to Zhang et al.[2] A Si wafer (ca. 1 cm×1 cm) was immersed overnight in a vial containing an initiator solution (5% BIBAPTES, 5% Milli Q water, and 90% absolute ethanol) at room temperature. The bromide initiated Si wafer was thoroughly washed with ethanol and Milli Q water, and dried in vacuo.

3.2 Assembly of PEGDMA Ultra-Thin Films on Si Wafer via CAP-ATRP.

Figure 21:
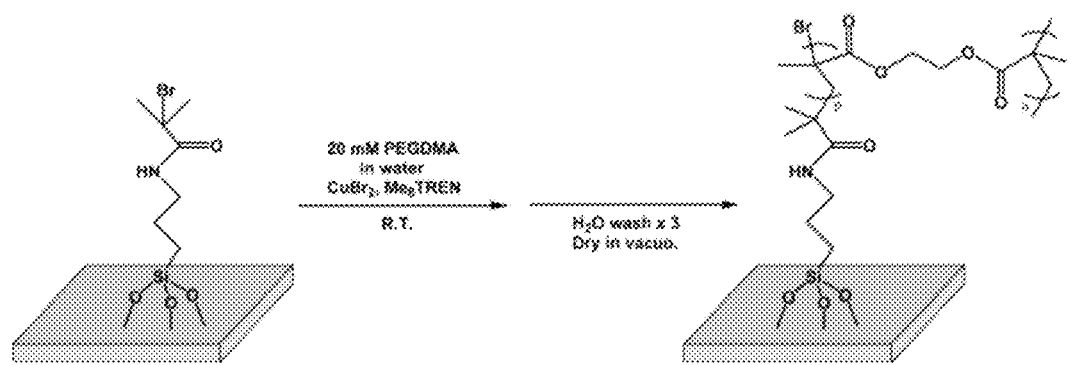
FIG. 21 illustrates a schematic diagram for the assembly of PEGDMA ultra-thin films on a Si wafer via CAP-ATRP according to Example 3.2.

FIG. 21 illustrates a schematic diagram for the assembly of PEGDMA ultra-thin films on a Si wafer via CAP-ATRP. Si wafers functionalized with bromo-initiator were conducted in an air-tight container (containing PEGDMA macrocross-linker (20 mM), $CuBr_2$ (1 mM), $Me_6TREN$ (1 mM) and NaAsc (3 mM) in Milli Q water). After designed reaction time at room temperature, the polymer-coated Si wafer were taken off, washed with DI water and dried in vacuo.

Example 4

4. Fabricate PEGDMA CAP Film on Porous Substrate

4.1 Fabrication of PDMS Cross-Linked Prelayer.

The cross-linked PDMS prelayer was coated onto PAN substrate as follows. In separate vials, TMC (7 mg, 0.0267 mmol) was dissolved in 0.35 mL of hexane (2.0% w/v) and $NH_2$-PDMS-$NH_2$ (0.2 g, 0.04 mmol, 1 equiv.) was dissolved in 10 mL of hexane (2.0% w/v). The two solutions were mixed for 30 s and 1 mL of the solution was then spin-coated (1 k rpm, 10 s) onto each PAN substrate (19.63 cm²) to prepare the PDMS gutter layer. Then 0.35 mL of TMC solution (1.0% w/v, in hexane) was added to 10 mL of P(DMS-co-BIBAPMS) solution (2.0% w/v, in hexane). 1 mL of the mixture was deposited onto each pre-coating substrate via spin-coat process (1 k rpm, 10 s). Finally, the coated PAN substrates were dried in vacuo (1 mbar) at 25° C. over night and tested for their gas transport properties to ensure that there is no leakage before coating the selective layer.

4.2 Assembly of PEGDMA Ultra-Thin Films on Porous Substrate via CAP-ATRP.

All substrates functionalized with a bromo-initiator were conducted in an air-tight container (containing PEGDMA macrocross-linker (20 mM), $CuBr_2$ (1 mM), $Me_6TREN$ (1 mM) and NaAsc (3 mM) in Milli Q water). After designed reaction time at room temperature, the polymer-coated substrates were taken off, washed with DI water and dried in vacuo.

Example 5

5. Fabricate Tri-PEGMA/PEGMA CAP Film on Porous Substrate

5.1 Synthesis of Tri-PEGMA Macro-Crosslinker.

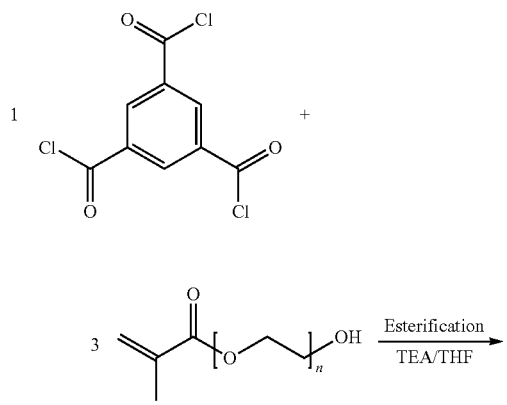

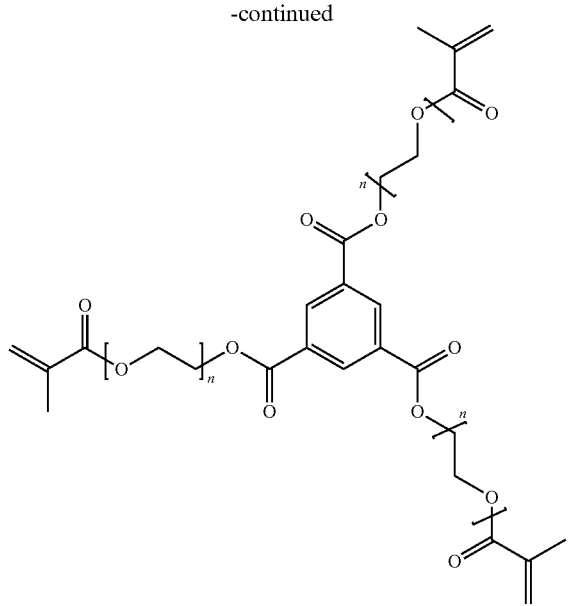

PEGMA (2 g, 3.8 mmol) and anhydrous TEA (3.9 mL, 28 mmol) were dissolved in 50 mL of anhydrous THF; 10 mL of TMC solution pre-dissolved in anhydrous THF (1.26 mmol; 3.78 mmol of carbonyl chloride) was added dropwise at 0° C. over 30 min under vigorous stirring. The mixture was then warm to room temperature and stirred for further 24 h. The precipitate of triethylamine hydrobromide was removed by filtration. The solution was then concentrated in vacuo (1 mbar) and the product was re-dissolved in 100 mL of DCM. The organic solution was then washed with $H_2O$ (3×50 mL), dried (anhydrous $MgSO_4$), filtered and concentrated in vacuo (1 mbar) at 30° C. Amorphous clear product, Tri-PEGMA with a yield of 95% was obtained.

5.2 Fabrication of PDMS Cross-Linked Prelayer.

The cross-linked PDMS prelayer was coated onto PAN substrate as follows. In separate vials, TMC (7 mg, 0.0267 mmol) was dissolved in 0.35 mL of hexane (2.0% w/v) and $NH_2$-PDMS-$NH_2$ (0.2 g, 0.04 mmol, 1 equiv.) was dissolved in 10 mL of hexane (2.0% w/v). The two solutions were mixed for 30 s and 1 mL of the solution was then spin-coated (1 k rpm, 10 s) onto each PAN substrate (19.63 cm$^2$) to prepare the PDMS gutter layer. Then 0.35 mL of TMC solution (1.0% w/v, in hexane) was added to 10 mL of P(DMS-co-BIBAPMS) solution (2.0% w/v, in hexane). 1 mL of the mixture was deposited onto each pre-coating substrate via spin-coat process (1 k rpm, 10 s). Finally, the coated PAN substrates were dried in vacuo (1 mbar) at 25° C. over night and tested for their gas transport properties to ensure that there is no leakage before coating the selective layer.

5.3 Assembly of Tri-PEGMA/PEGMEMA Ultra-Thin Films on Porous Substrate via CAP-ATRP.

All substrates functionalized with a bromo-initiator were conducted in an air-tight container (containing Tri-PEGMA macrocross-linker blending with various proportions of PEGMEMA (20 mM), CuBr$_2$ (1 mM), Me$_6$TREN (1 mM) and NaAsc (3 mM) in Milli Q water). After designed reaction time at room temperature, the polymer-coated substrates were taken off, washed with DI water and dried in vacuo.

Example 6

6. Fabrication of Hybrid Fe(DA)$_x$ Nanoparticles Blend PEGMA CAP Film on Porous Substrate (DA=Dopamine)

6.1 Fabrication of PDMS Cross-Linked Prelayer.

The cross-linked PDMS prelayer was coated onto PAN substrate as follows. In separate vials, TMC (7 mg, 0.0267 mmol) was dissolved in 0.35 mL of hexane (2.0% w/v) and $NH_2$-PDMS-$NH_2$ (0.2 g, 0.04 mmol, 1 equiv.) was dissolved in 10 mL of hexane (2.0% w/v). The two solutions were mixed for 30 s and 1 mL of the solution was then spin-coated (1 k rpm, 10 s) onto each PAN substrate (19.63 cm$^2$) to prepare the PDMS gutter layer. Then 0.35 mL of TMC solution (1.0% w/v, in hexane) was added to 10 mL of P(DMS-co-BIBAPMS) solution (2.0% w/v, in hexane). 1 mL of the mixture was deposited onto each pre-coating substrate via spin-coat process (1 k rpm, 10 s). Finally, the coated PAN substrates were dried in vacuo (1 mbar) at 25° C. over night and tested for their gas transport properties to ensure that there is no leakage before coating the selective layer.

6.2 Assembly of FeDA NPs/PEGDMA Ultra-Thin Films on Porous Substrate via CAP-ATRP.

All substrates functionalized with a bromo-initiator were conducted in an air-tight container (containing PEGDMA macrocross-linker (20 mM), CuBr$_2$ (1 mM), Me$_6$TREN (1 mM) and NaAsc (3 mM) in Milli Q water degassed via bubbling N$_2$ gas). In order to control the Fe$^{3+}$/DA molar ratio at 1:3, 1:6, 1:9 and 1:12, different amounts of DA-HCl power and FeCl$_3$ was dissolved in the degassed H$_2$O via bubbling N$_2$ gas. The prepared FeDA solutions were added into the CAP solution with different amounts of FeDA NPs to obtain 0, 7.7, 15 and 30 wt % to PEGDMA mass. The formation of FeDA NPs/PEGDMA ultra-thin films were started as the functionalized substrates were immersed into the CAP solution. After designed reaction time at room temperature, the polymer-coated substrates were taken off, washed with DI water and dried in vacuo.

TABLE 1

Concentrations of Fe$^{3+}$ and DA to obtain the different Fe$^{3+}$/DA molar ratio.

| Fe$^{3+}$:DA | Fe$^{3+}$ [mM] | DA [mM] |
| --- | --- | --- |
| 1:3 | 1.027 | 3.076 |
| 1:6 | 1.027 | 6.152 |
| 1:9 | 1.027 | 9.228 |
| 1:12 | 1.027 | 12.3 |

Example 7

7. Measurement of Gas Permeance and Selectivity 7.1 Theory.

The mass transport in non-porous polymeric membranes follows the solution-diffusion mechanism that has been well documented in the literature[4]. The flux (J) of a single gas A can be calculated from equation (1):

$$J_A = P_A(\Delta p/l) \quad (1)$$

Where $P_A$ is the permeability of gas A in Barrer, $\Delta p$ is the pressure difference across the membrane in bar and l is the membrane thickness in μm.

The membrane permeance is defined as the permeability divided by the membrane thickness and has a unit of GPU. This permeance can also be expressed in terms of a total resistance to flow ($R_T$) by:

$$J_A = \left(\frac{P_A}{l}\right) \cdot \Delta p = \frac{\Delta p}{R_T} \quad (2)$$

In turn, the total resistance ($R_T$) to permeation through TFC membranes can be expressed as the sum of the resistances from the feed side boundary layer ($R_F$), the permeate side boundary layer ($R_P$), the membrane selective layer ($R_{SL}$) and the gutter layer ($R_G$) coated on the microporous substrate:

$$R_T = R_F + R_P + R_{SL} + R_G \quad (3)$$

The boundary layer resistances ($R_F$ and $R_P$) arise from concentration gradients that are formed at the surface of the membrane in mixed gas systems. However, such concentration polarization is not possible for single gas permeation. Thus the total resistance to flow is related only to the respective thicknesses of the selective and gutter layers and their respective permeability[5]:

$$R_T = R_{SL} + R_G = \frac{l_{SL}}{P_{SL}} + \frac{l_G}{P_G} \quad (4)$$

The resistance to flow through the gutter layer ($R_G = l_G/P_G$) can be determined by measuring the flux through this layer prior to deposition of the selective layer. Equations (2) and (4) can then be used to determine the permeance and permeability through the selective layer, by measuring the flow through the combined TFC membrane. However, it should be noted that the estimation of the permeability is highly dependent on the accuracy in determining the thickness of the selective layer.

The ideal single gas selectivity ($\alpha_{A/B}$) between two gases A and B can be expressed by the following equation:

$$\alpha_{A/B} = \frac{P_A}{P_B} \quad (5)$$

7.2 Single Gas Permeation Measurement.
Gas Permeation Testing Set-Up

Figure 18:
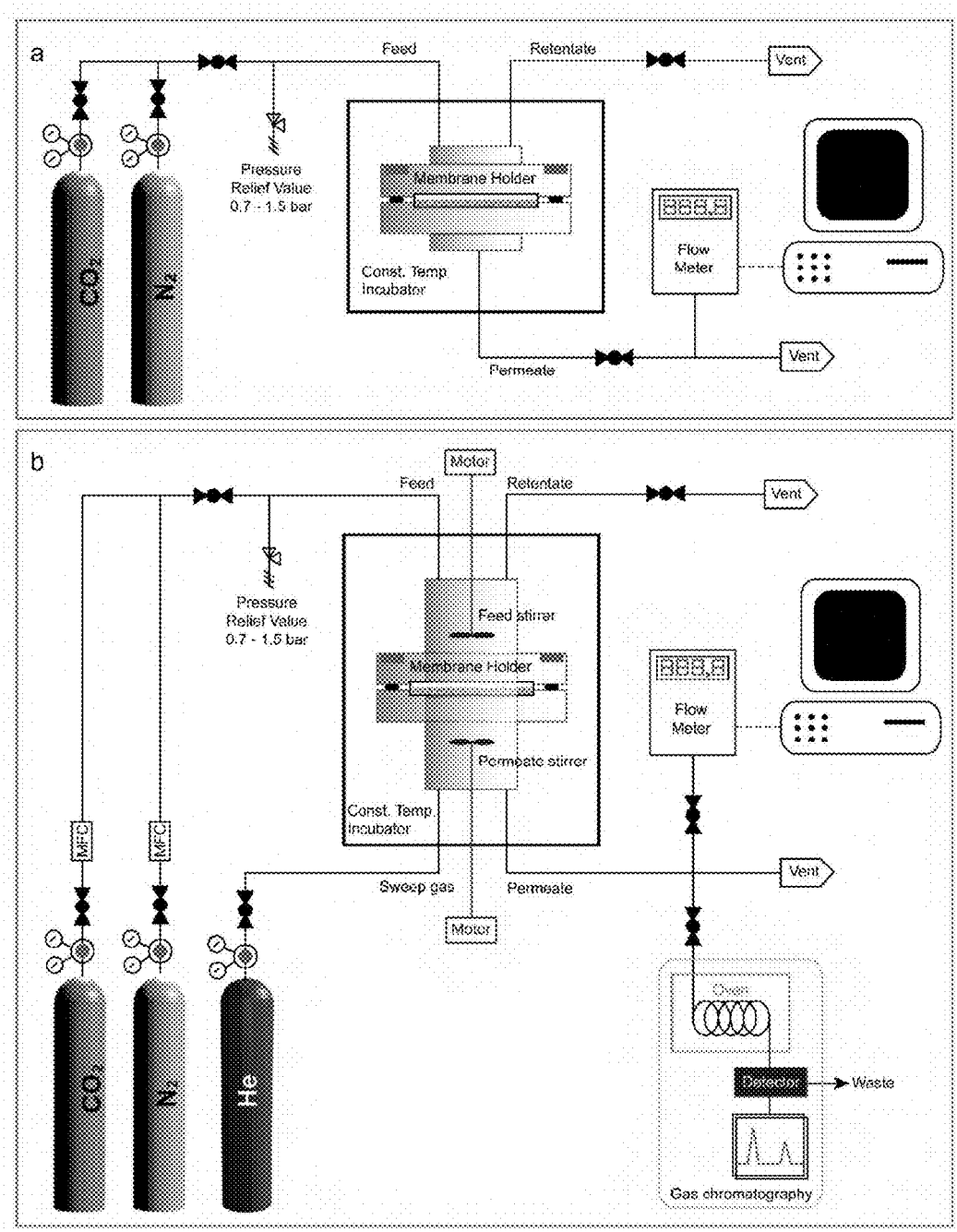
FIG. 18 illustrates a schematic diagram of apparatus for measurement of gas flow rate; (a) Single gas permeation measurements, and (b) mixed gas permeation measurements.

The permeance of individual gases through the ultra-thin film (UTF) composite membranes were tested by an in-house built apparatus. The schematic diagram of the permeation rig is shown in FIG. 18 (a). The UTFCMs were installed in a stainless cell and were tested with $N_2$ first and then $CO_2$ at 340 kPa (gauge pressure) and 35° C. All data presented in this work were collected from at least three UTFC membranes. PAN substrates that were coated with the PDMS initiator layer alone were tested under the same conditions to detect any leakages. The flow rate of each permeating gas was tested manually with a digital flow meter (Agilent Technologies ADM 2000).

7.3 Mixed Gas Permeation Measurement.

The permeance of $CO_2/N_2$ gas mixtures was determined at 35° C. using a novel mixed gas permeation set-up as shown in FIG. 18 (b). The feed composition was 10 vol. % $CO_2$/90 vol. % $N_2$. Helium (HP He, BOC Australia) were used as a sweep gas on the permeate side to continuously remove the permeated components from the membrane cell. The sweep gas pressure was set at 100 kPa while the flow rate was controlled using an Aalborg Mass Flow Controller (MFC, 0-250 mL/min). The compositions of the feed, retentate and permeate side were analyzed by gas chromatography (GC 7820 A, Agilent Technologies) to determine the $CO_2$ and $N_2$ concentration.

Test Results

The CAP ultra-thin film membranes prepared as described above were subjected to the permeance testing as outlined in the detailed description above. The permeance test results are set out in Tables 2-7.

TABLE 2

Gas separation performance of the P(EO-co-GMA) CAP membranes and their selective layers at 35° C. and 340 kPa.

| | | UTFC membranes | | | Selective layers | | |
|---|---|---|---|---|---|---|---|
| Sample | Polymerization time (h) | $CO_2$ (GPU) | $N_2$ (GPU) | Selectivity ($CO_2/N_2$) | $CO_2$ (GPU) | $N_2$ (GPU) | Selectivity ($CO_2/N_2$) |
| CAP1-1 h | 1 | 2050 | 172 | 12 | — | — | — |
| CAP1-2 h | 2 | 1780 | 134 | 13 | — | — | — |
| CAP1-4 h | 4 | 1150 | 87 | 13 | — | — | — |
| CAP1-6 h | 6 | 1130 | 51 | 22 | 3140 | 68 | 47 |
| CAP1-9 h | 9 | 1120 | 52 | 21 | 3060 | 69 | 44 |

TABLE 3

Summary of gas permeation properties of the different molecular weight PEGDMA CAP membranes, tested at 35° C. and 340 kPa.

| | | | Permeance (GPU) | | Selectivity |
|---|---|---|---|---|---|
| Sample | Polymerization time (h) | Number of EO unit | $CO_2$ | $N_2$ | $CO_2/N_2$ |
| PDMS | — | — | 2330 | 297 | 8 |
| PEG4-CAP2-1 h | 1 | 4 | 2570 | 2090 | 1 |
| PEG4-CAP2-2 h | 2 | 4 | 460 | 117 | 4 |
| PEG4-CAP2-4 h | 4 | 4 | 307 | 43 | 7 |
| PEG4-CAP2-9.5 h | 9.5 | 4 | 1940 | 1750 | 1 |
| PEG9-CAP2-1 h | 1 | 9 | 2380 | 230 | 11 |
| PEG9-CAP2-2 h | 2 | 9 | 1540 | 160 | 9 |
| PEG9-CAP2-4 h | 4 | 9 | 1140 | 52 | 22 |
| PEG9-CAP2-9.5 h | 9.5 | 9 | 530 | 26 | 21 |
| PEG13-CAP2-1 h | 1 | 13 | 2140 | 150 | 14 |
| PEG13-CAP2-2 h | 2 | 13 | 1490 | 75 | 20 |
| PEG13-CAP2-4 h | 4 | 13 | 1110 | 62 | 18 |
| PEG13-CAP2-9.5 h | 9.5 | 13 | 1040 | 58 | 18 |

TABLE 4

Gas separation performance of the UTFCMs[a] (Tri-PEGMA/PEGMA) as a function of polymerization time at 35° C. and 340 kPa. All data is for pure single gases.

| | | UTFC membranes | | | Selective layers | | |
|---|---|---|---|---|---|---|---|
| Sample | Polymerization time (h) | $CO_2$ (GPU) | $N_2$ (GPU) | Selectivity ($CO_2/N_2$) | $CO_2$ (GPU) | $N_2$ (GPU) | Selectivity ($CO_2/N_2$) |
| CAP3-1 h | 1 | 2200 | 183 | 12 | — | — | — |
| CAP3-2 h | 2 | 1870 | 116 | 16 | — | — | — |
| CAP3-4 h | 4 | 1260 | 29 | 43 | 1610 | 30 | 54 |
| CAP3-6 h | 6 | 1160 | 28 | 41 | 1510 | 30 | 50 |

[a]All the CAP3 samples have the same Tri-PEGMA mass loading of 26 wt. %.

TABLE 5

Gas separation performance of the UTFCMs[a] (XL3/P3) and their selective layers as a function of XL3 mass loading at 35° C. and 340 kPa. All data is for pure single gases.

| | | UTFC membrane | | | Selective layer | | |
|---|---|---|---|---|---|---|---|
| Sample | P3 (wt. %) | $CO_2$ permeance (GPU) | Selectivity $CO_2/N_2$ | Thickness (nm) | $CO_2$ permeance (GPU) | $CO_2$ permeability (Barrer) | Selectivity $CO_2/N_2$ |
| Prelayer | N/A | 2880 | 10 | — | — | — | — |
| CAP3-0% | 0 | 2000 | 12 | 175 | — | — | — |
| CAP3-5% | 5 | 1670 | 16 | 165 | — | — | — |
| CAP3-9% | 9 | 1360 | 33 | 145 | 1810 | 262 | 39 |
| CAP3-26% | 26 | 1260 | 43 | 125 | 1610 | 201 | 54 |
| CAP3-44% | 44 | 1100 | 42 | 130 | 1410 | 184 | 51 |
| CAP3-100% | 100 | 1120 | 42 | 125 | 1460 | 183 | 51 |

[a]All the CAP3-wt % samples have the same polymerization time of 4 hours.

TABLE 6

The comparison of $CO_2$ permeance, permeability and $CO_2/N_2$ selectivity through the PDMS initiator layer, CAP1-6h, CAP2-4h and CAP3-26% UTFCMs under single and mixed gas permeation conditions.

| Composite Membranes | Single gas permeation | | | Mixed gas permeation | | |
|---|---|---|---|---|---|---|
| | $P_{CO2}$ (GPU) | $P_{N2}$ (GPU) | α ($CO_2/N_2$) | $P_{CO2}$ (GPU) | $P_{N2}$ (GPU) | α ($CO_2/N_2$) |
| Initiator layer | 2,880 | 290 | 10 | 1,870 | 125 | 15 |
| CAP1-6 h | 1,130 | 51 | 22 | 1,010 | 34 | 30 |
| CAP2-4 h | 1,140 | 52 | 22 | 1,020 | 34 | 30 |
| CAP3-4 h | 1,260 | 29 | 43 | 900 | 21 | 43 |

TABLE 7

Gas separation performance of the Fe(DA)$_x$ NPs/PEGDMA CAP membranes and their selective layers at 35° C. and 350 kPa.

| | UTFC membranes | | | Selective layers | | |
|---|---|---|---|---|---|---|
| | $CO_2$ (GPU) | $N_2$ (GPU) | Selectivity ($CO_2/N_2$) | $CO_2$ (GPU) | $N_2$ (GPU) | Selectivity ($CO_2/N_2$) |
| Fe(DA)$_3$/PEGDMA [wt %] | | | | | | |
| 7.7 | 819 | 26 | 31 | 1369 | 33 | 42 |
| 15 | 1163 | 45 | 26 | 2554 | 61 | 42 |
| 30 | 1344 | 90 | 15 | 3135 | 149 | 21 |
| Fe(DA)$_6$/PEGDMA [wt %] | | | | | | |
| 7.7 | 869 | 25 | 35 | 1408 | 31 | 46 |
| 15 | 1008 | 30 | 34 | 1758 | 37 | 48 |
| 30 | 2255 | 225 | 10 | 11682 | 834 | 14 |

TABLE 7-continued

Gas separation performance of the Fe(DA)$_x$ NPs/PEGDMA CAP membranes and their selective layers at 35° C. and 350 kPa.

| | UTFC membranes | | | Selective layers | | |
|---|---|---|---|---|---|---|
| | $CO_2$ (GPU) | $N_2$ (GPU) | Selectivity ($CO_2/N_2$) | $CO_2$ (GPU) | $N_2$ (GPU) | Selectivity ($CO_2/N_2$) |
| Fe(DA)$_9$/PEGDMA [wt %] | | | | | | |
| 7.7 | 374 | 12 | 30 | 481 | 15 | 33 |
| 15 | 525 | 15 | 36 | 725 | 17 | 42 |
| 30 | 790 | 21 | 38 | 1221 | 24 | 51 |
| Fe(DA)$_{12}$/PEGDMA [wt %] | | | | | | |
| 7.7 | 244 | 8 | 31 | 299 | 9 | 33 |
| 15 | 487 | 14 | 35 | 657 | 16 | 42 |
| 30 | 823 | 19 | 44 | 1315 | 21 | 61 |

REFERENCES 1. (a) Merkel, T. C.; Lin, H.; Wei, X.; Baker, R., Power plant post-combustion carbon dioxide capture: An opportunity for membranes. *J. Membr. Sci.* 2010, 359, 126-139; (b) Merkel, T. C.; Lin, H.; Wei, X.; Baker, R., Power plant post-combustion carbon dioxide capture: An opportunity for membranes. *Journal of Membrane Science* 2010, 359 (1), 126-139.
2. Zhang, Z.; Wang, J.; Tu, Q.; Nie, N.; Sha, J.; Liu, W.; Liu, R.; Zhang, Y.; Wang, J., Surface modification of PDMS by surface-initiated atom transfer radical polymerization of water-soluble dendronized PEG methacrylate. *Colloids and Surfaces B: Biointerfaces* 2011, 88 (1), 85-92.
3. Javaid, A., Membranes for solubility-based gas separation applications. *Chemical Engineering Journal* 2005, 112 (1), 219-226.
4. Li, P.; Chen, H. Z.; Chung, T.-S., The effects of substrate characteristics and pre-wetting agents on PAN-PDMS composite hollow fibre membranes for $CO_2/N_2$ and $O_2/N_2$ separation. *J. Membr. Sci.* 2013, 434, 18-25.
5. Chen, G. Q.; Scholes, C. A.; Qiao, G. G.; Kentish, S. E., Water vapour permeation in polyimide membranes. *J. Membr. Sci.* 2011, 379, 479-487.

The invention claimed is:

1. A gas separation membrane for separating a target gas species from a mixture of gas species, the membrane comprising:
   (i) a porous substrate having a first and second surface region between which the mixture of gas species will flow;
   (ii) a sealing polymer layer of different composition to the porous substrate that (a) forms a continuous coating across the second surface region of the substrate, and (b) is permeable to the mixture of gas species; and
   (iii) a selective polymer layer in the form of a cross linked macromolecular film that (a) is located on and covalently coupled to the sealing polymer layer, and (b) has a higher permeability to the target gas species relative to other gas species present in the mixture of gas species that is to be subjected to separation.

2. The gas separation membrane according to claim 1, wherein the porous substrate is made of a polymer or inorganic material.

3. The gas separation membrane according to claim 1, wherein the porous substrate is made of poly(acrylonitrile) homo- or co-polymer, polysulfone homo- or co-polymer, polyethylene terephthalate homo- or co-polymer, or polyimide homo- or co-polymer.

4. The gas separation membrane according to claim 1, wherein the porous substrate is in the form of a sheet material or hollow fibre.

5. The gas separation membrane according to claim 1, wherein the sealing polymer layer has a thickness ranging from about 10 nm to about 500 nm.

6. The gas separation membrane according to claim 1, wherein the sealing polymer layer is a substituted polyacetylene or polysiloxane layer.

7. The gas separation membrane according to claim 1, wherein the selective polymer layer is a crosslinked polyethylene glycol layer, a crosslinked amorphous polyethylene oxide layer, a crosslinked branched amorphous polyethylene oxide layer, a crosslinked polyimide layer, a crosslinked polyimide-block-polydimethylsiloxane layer, a crosslinked polydimethylsiloxane-block-polyethylene oxide multiblock copolymer layer, or a crosslinked polydimethylsiloxane-block-polyethylene glycol layer.

8. The gas separation membrane according to claim 1, wherein the selective polymer layer has a thickness ranging from about 10 nm to about 100 nm.

9. The gas separation membrane according to claim 1, wherein the selective polymer layer incorporates solid nanoparticles within its polymer matrix.

10. A method of preparing a gas separation membrane for separating a target gas species from a mixture of gas species, the method comprising:
   (i) providing a porous substrate having (a) a first and second surface region between which the mixture of gas species will flow, and (b) a sealing polymer layer that forms a continuous coating across the second surface region and is permeable to the mixture of gas species; wherein the sealing polymer layer is of different composition to the porous substrate and presents at its outermost surface a plurality of living polymerisation moieties that are covalently bound to polymer chains that form part of the sealing polymer layer; and
   (ii) forming on the outermost surface of the sealing polymer layer a selective polymer layer in the form of a crosslinked macromolecular film by polymerising, under the control of the living polymerisation moieties, macromolecules having a plurality of polymerisable functional groups; wherein the resulting selective polymer layer has a higher permeability to the target gas species relative to other gas species present in the mixture of gas species that is to be subjected to separation.

11. The method according to claim 10, wherein the sealing polymer layer is applied onto the second surface region of the porous substrate by way of spin coating, knife coating or dip coating.

12. The method according to claim 11, wherein the sealing polymer layer is crosslinked.

13. The method according to claim 10, wherein the sealing polymer layer is applied onto the second surface region of the porous substrate in a multi-step process, and wherein the last step in that application process comprises applying polymer having a plurality of living polymerisation moieties covalently bound thereto.

14. The method according to claim 10, wherein the living polymerisation moieties are selected from those which promote ionic polymerisation, controlled radial polymerisation, and ring opening metathesis polymerisation.

15. The method according to claim 10, wherein the macromolecules have a plurality of polymerisable ethylenically unsaturated groups.

16. The method according to claim 10, wherein the macromolecules are selected from an oligomer or polymer of polyethylene glycol, polyethylene oxide, polyimide, polyimide-block-polydimethylsiloxane, polydimethylsiloxane-block-polyethylene oxide, polydimethylsiloxane-block-polyethylene glycol, and combinations thereof, where each polymer has a plurality of polymerisable functional groups covalently bound thereto.

17. A process for separating a target gas species from a mixture of gas species, the process comprising:
(i) contacting the mixture of gas species to be separated with the gas separation membrane according to claim 1;
(ii) creating a difference in pressure across the gas separation membrane to facilitate transport of the target gas species through the selective polymer layer so as to provide for a separated gas composition; wherein the concentration of the target gas species is higher in the separated gas composition compared with that in the mixture of gas species that was subjected to separation.

18. The process according to claim 17, wherein the mixture of gas species comprises a combination of two or more gas species selected from $N_2$, $H_2$, $CH_4$, $O_2$, $H_2O$, $H_2S$, $SO_x$, $NO_x$, HCl, He, and $CO_2$.

19. The process according to claim 17, wherein the target gas species is $CO_2$ and the mixture of gas species comprises $CO_2$ and one more gases selected from $N_2$, $H_2$, $CH_4$, $O_2$, $H_2O$, $H_2S$, $SO_x$, $NO_x$, and He.

20. The process according to claim 17 which provides for a $CO_2$ permeance of at least 3000 GPU, and/or a selectivity of more than 7 for $CO_2/N_2$, and/or a selectivity of more than 3 for $CO_2/CH_4$.

* * * * *